US008732536B2

(12) United States Patent
Nakamura

(10) Patent No.: US 8,732,536 B2
(45) Date of Patent: May 20, 2014

(54) COMMUNICATION SYSTEM AND COMMUNICATION APPARATUS STATE DETERMINING METHOD

(75) Inventor: Masato Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 287 days.

(21) Appl. No.: 13/388,853

(22) PCT Filed: Aug. 4, 2010

(86) PCT No.: PCT/JP2010/063216
§ 371 (c)(1),
(2), (4) Date: Feb. 3, 2012

(87) PCT Pub. No.: WO2011/021505
PCT Pub. Date: Feb. 24, 2011

(65) Prior Publication Data
US 2012/0137184 A1 May 31, 2012

(30) Foreign Application Priority Data
Aug. 18, 2009 (JP) ................................ 2009-189381

(51) Int. Cl.
*G06F 11/00* (2006.01)
(52) U.S. Cl.
USPC ........................................................... 714/49
(58) Field of Classification Search
CPC ............................ G06F 11/006; G06F 11/3041
USPC .......................................................... 714/49
See application file for complete search history.

(56) References Cited

U.S. PATENT DOCUMENTS

| 5,191,580 A * | 3/1993 | Nakano et al. ................. 370/453 |
| 5,517,669 A | 5/1996 | Ohkura et al. |
| 2002/0062410 A1* | 5/2002 | Sasamori et al. ............... 710/36 |
| 2011/0093559 A1* | 4/2011 | Yabusaki et al. .............. 709/208 |

FOREIGN PATENT DOCUMENTS

| JP | 06-252895 A | 9/1994 |
| JP | 06-274463 A | 9/1994 |
| JP | 09-261233 A | 10/1997 |
| JP | 10-229412 A | 8/1998 |

OTHER PUBLICATIONS

International Search Report, dated Sep. 21, 2010.

* cited by examiner

*Primary Examiner* — Charles Ehne
(74) *Attorney, Agent, or Firm* — Sughrue Mion, PLLC

(57) ABSTRACT

A slave station 30 includes a cyclic-memory managing unit 36 that generates data expansion state information indicating whether received cyclic data is expanded into a cyclic memory 33 and data processing state information indicating whether the slave station 30 is in a state in which the slave station 30 can receive data frame at the time of receiving the data frame, and a frame transmitting unit 38 that transmits a state notification frame including the data expansion state information and the data processing state information to a master station. The master station includes a system-abnormal-state determining unit that determines, when a token frame is received, an error state of the slave station 30 using the data expansion state information and the data processing state information of the state notification frame received by a frame receiving unit.

19 Claims, 13 Drawing Sheets

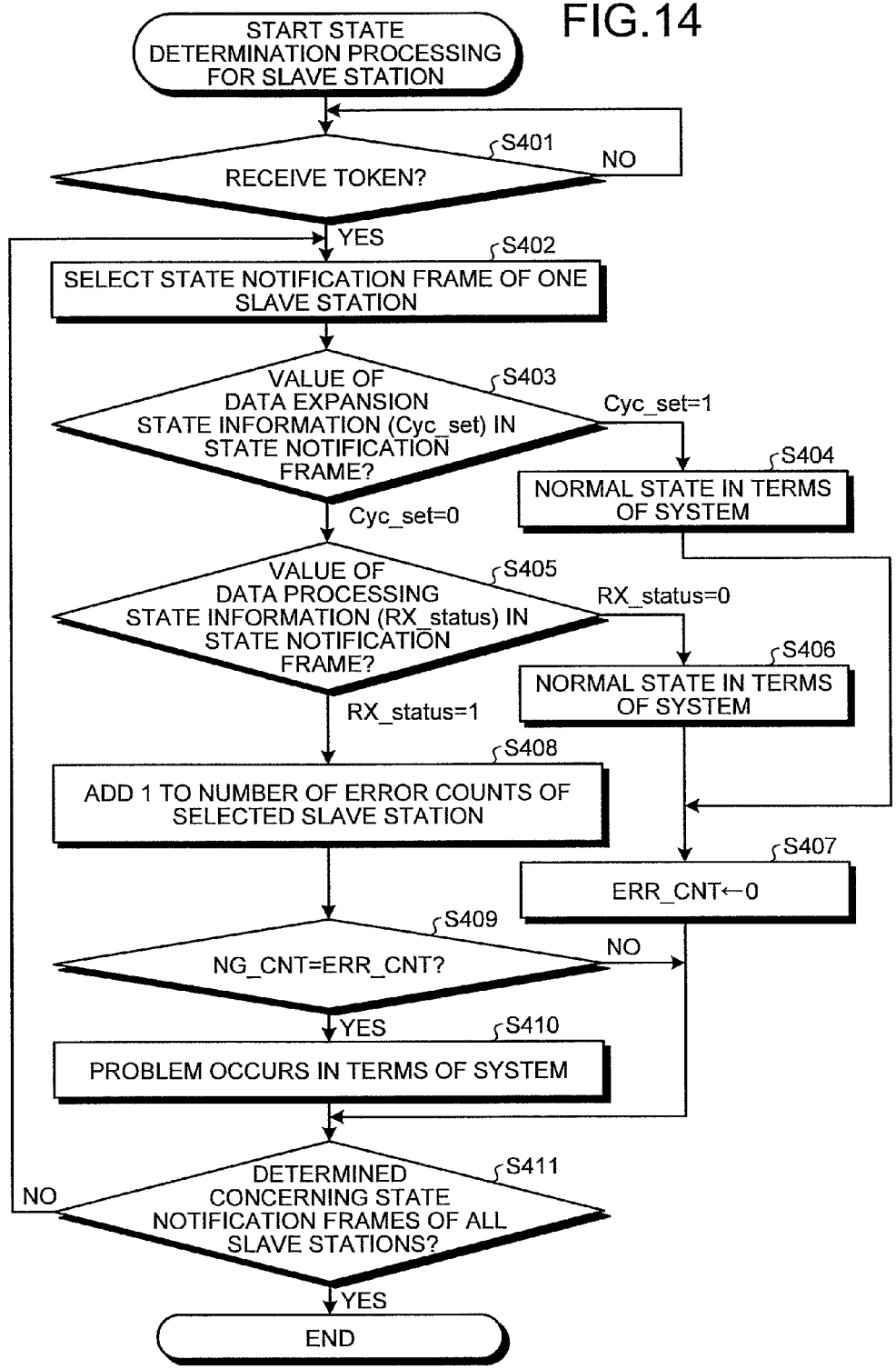

COMMUNICATION SYSTEM AND COMMUNICATION APPARATUS STATE DETERMINING METHOD

CROSS REFERENCE TO RELATED APPLICATIONS

This application is a National Stage of International Application No. PCT/JP2010/063216 filed Aug. 4, 2010, claiming priority based on Japanese Patent Application No. 2009-189381, filed Aug. 18, 2009, the contents of all of which are incorporated herein by reference in their entirety.

FIELD

The present invention relates to a communication system that performs communication using a token frame between communication nodes connected by a transmission line and a communication apparatus state determining method.

BACKGROUND

An FA (Factory Automation) system includes control target apparatuses and a control apparatus such as a programmable controller that performs predetermined arithmetic processing using states of the control target apparatuses as input data and outputs operation conditions of the control target apparatuses as output data. Communication means are provided in the control apparatus and the control target apparatuses to connect the control apparatus and the control target apparatuses via a network to thereby enable real-time control. Specifically, the communication means provided in the control target apparatuses are caused to function as slave stations. The communication means provided in the control apparatus is caused to function as a communication management station that controls data transmission of the slave stations. The communication management station receives data from the slave stations and periodically performs processing for transmitting data for controlling the control target apparatuses, which is computed by the control apparatus using the received data, to the slave stations. At this point, the communication management station controls timing of the data transmission by the slave stations to ensure real-time properties of data communication.

A data communication method employing a token passing system to ensure the real-time properties of the data communication is known. The token passing system is a system for feeding, in order, a token frame to communication nodes including a communication management station and slave stations present in a system and giving a transmission right to the communication nodes, whereby the communication nodes transmit data. It is possible to perform cyclic data communication by circulating the token frame at a predetermined period (see, for example, Patent Literature 1).

In Patent Literature 1, when a slave station cannot normally receive a data frame transmitted from the communication management station, the slave station transmits a data frame to the communication management station with information indicating abnormality included in a reception error occurrence detection field provided in the data frame. The communication management station retransmits the data frame, transmitted last time, to the transmission source of the data frame having the reception error occurrence detection field indicating abnormality.

Citation List

Patent Literature

Patent Literature 1: Japanese Patent Application Laid-open No. H6-252895

SUMMARY

Technical Problem

The circulation period of the token frame is usually determined to match a slave station having a highest processing ability. In general, a slave station having a high processing ability and a slave station having a low processing ability are mixed in the communication system. The slave station having the high processing ability can receive, every time the communication management station transmits a data frame, data of the data frame and process the data. However, the slave station having the low processing ability cannot receive and process the next data frame while the slave station is processing the data frame transmitted by the communication management station.

Even if, because the slave station is processing a data frame, such a slave station having the low processing ability cannot receive and process the next data frame and processing of a data frame transmitted by the communication management station is left over, a normal operation is performed in terms of the system configuration. This does not lead to a systematic problem in an application level due to a loss of information (data) between the communication management station and the slave station due to disappearance of a frame. However, in the past, retransmission of data is determined according to whether a data frame has been able to be received and processed. Therefore, in such a case, it is likely that the slave station is determined as abnormal as a system. In other words, in the past, a method of determining, from a reception state of a data frame of the slave station, whether the slave station is abnormal as a system is not proposed.

In Patent Literature 1, necessity of retransmission of cyclic data is determined according to presence or absence of occurrence of data corruption in a received data frame. Therefore, when a switching hub that transfers data after storing the data is present between the communication nodes, corrupted data is discarded in the switching hub. Therefore, if Patent Literature 1 is applied to a communication system having a network configuration in which the switching hub is present between the communication nodes, there is a problem in that retransmission processing for a data frame cannot be executed.

The present invention has been devised in view of the above and it is an object of the present invention to obtain a communication system that circulates a token frame and ensures real-time properties of data communication, the communication system being capable of determining, from a reception state of a data frame of a slave station, whether the slave station is abnormal as a system, and a communication apparatus state determining method.

Solution to Problem

A communication system according to an aspect of the present invention circulates a token frame in order in a network in which one communication management apparatus and one or more communication apparatuses are connected via a transmission line and repeatedly performs transmission of a data frame at a predetermined period, wherein the communication apparatus includes: a memory that stores cyclic data addressed to the own station received from the communication management apparatus; an arithmetic processing unit that performs a predetermined arithmetic operation using the cyclic data stored in the memory; a cyclic data temporary buffer that temporarily stores the cyclic data; a cyclic-data-reception checking unit that determines whether the cyclic data addressed to the own station is normally received in the cyclic data temporary buffer and outputs cyclic data reception state information, which is a result of the determination; a monitoring unit that outputs data rewriting permission information when the arithmetic processing unit instructs expansion into the memory of the cyclic data stored in the cyclic data temporary buffer; a cyclic-memory managing unit that determines, based on the cyclic data reception state information and the data rewriting permission information, whether the normally-received cyclic data is to be expanded into the memory, and generates data expansion state information indicating whether a data frame is expanded into the memory at the time of receiving the data frame from the communication management apparatus and data processing state information indicating whether the communication apparatus is in a state in which the communication apparatus can receive the data frame at the time of receiving the data frame; a state-notification-frame generating unit that generates, when the own apparatus has a transmission right, a state notification frame addressed to the communication management apparatus including the data expansion state information and the data processing state information; and a frame transmitting unit that transmits, when the own apparatus has the transmission right, a data frame generated by the arithmetic processing unit and the state notification frame, and the communication management apparatus includes: a cyclic-data processing unit that performs a predetermined arithmetic operation using a data frame received from the communication apparatus connected to the network and generates cyclic data for the communication apparatus; a frame transmitting unit that transmits the cyclic data to the communication apparatus when the own apparatus has the transmission right; a frame receiving unit that receives the data frame transmitted from the communication apparatus; and a system-abnormal-state determining unit that determines, when the token frame, the transmission right of which is given to the own apparatus, is received, an error state of the communication apparatus using the data expansion state information and the data processing state information of the state notification frame from the communication apparatus received from the frame receiving unit.

Advantageous Effects of Invention

According to the present invention, there is an effect that the communication apparatuses can notify the communication management apparatus of data expansion state information indicating whether cyclic data was expanded into a memory and data processing state information indicating whether the communication apparatuses were in a state in which the communication apparatuses were able to receive a data frame at the time of receiving the cyclic data and the communication management apparatus can determine, using data electric field state information and data processing state information, whether an apparatus state at the time of receiving the cyclic data of the communication apparatus is a problem related to its own system. Consequently, there is an effect that, for example, when a processing ability of the communication apparatus is low and the communication apparatus cannot receive the cyclic data from the communication management apparatus, it is possible to prevent the communication apparatus from being determined as having a problem related to its own system and it is unnecessary to perform, for example, unnecessary inspection of the communication system.

BRIEF DESCRIPTION OF DRAWINGS

FIG. 14 is a flowchart explaining an example of a procedure of determination processing for an abnormal state of a communication system by the master station.

DESCRIPTION OF EMBODIMENTS

Communication systems and communication apparatus state determining methods according to embodiments of the present invention are explained in detail below with reference to the accompanying drawings. The present invention is not limited by these embodiments.

First Embodiment

Figure 1:
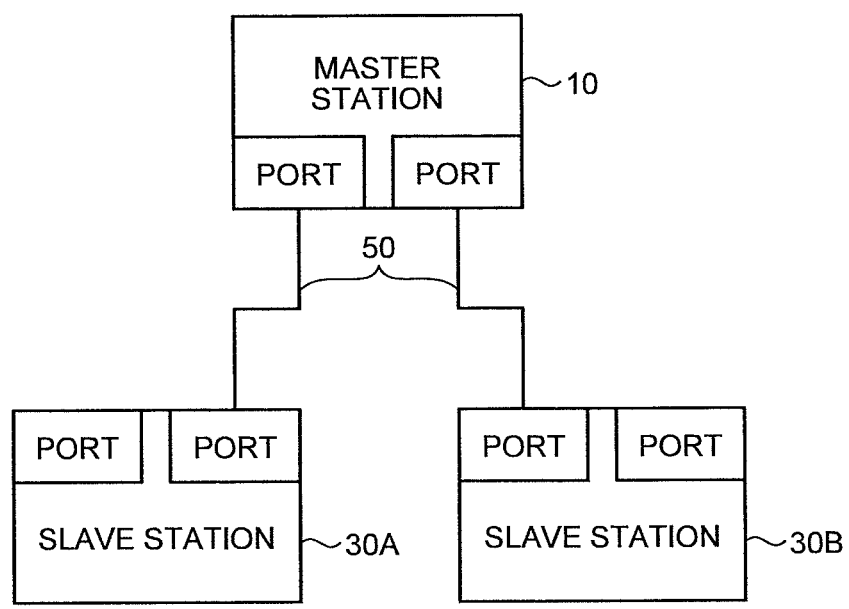
FIG. 1 is a diagram of an example of a communication system in which communication is performed using a token according to a first embodiment.

FIG. 1 is a diagram of an example of a communication system in which communication is performed using a token according to a first embodiment. This communication system is configured by a network of the same segment in which a plurality of communication nodes 10, 30A, and 30B are connected in a line shape or a star shape via a transmission line such as an Ethernet (registered trademark). As communication nodes, one master station 10 as a communication management apparatus that manages transmission and reception of data (a frame) in the network of the same segment and two slave stations 30A and 30B that perform transmission of data (a frame) based on setting by the master station 10 are provided. Each of the master station 10 and the slave stations 30A and 30B has two ports. The ports of the communication nodes are connected via a cable 50 such as a twisted pair cable or an optical fiber.

Figure 2:
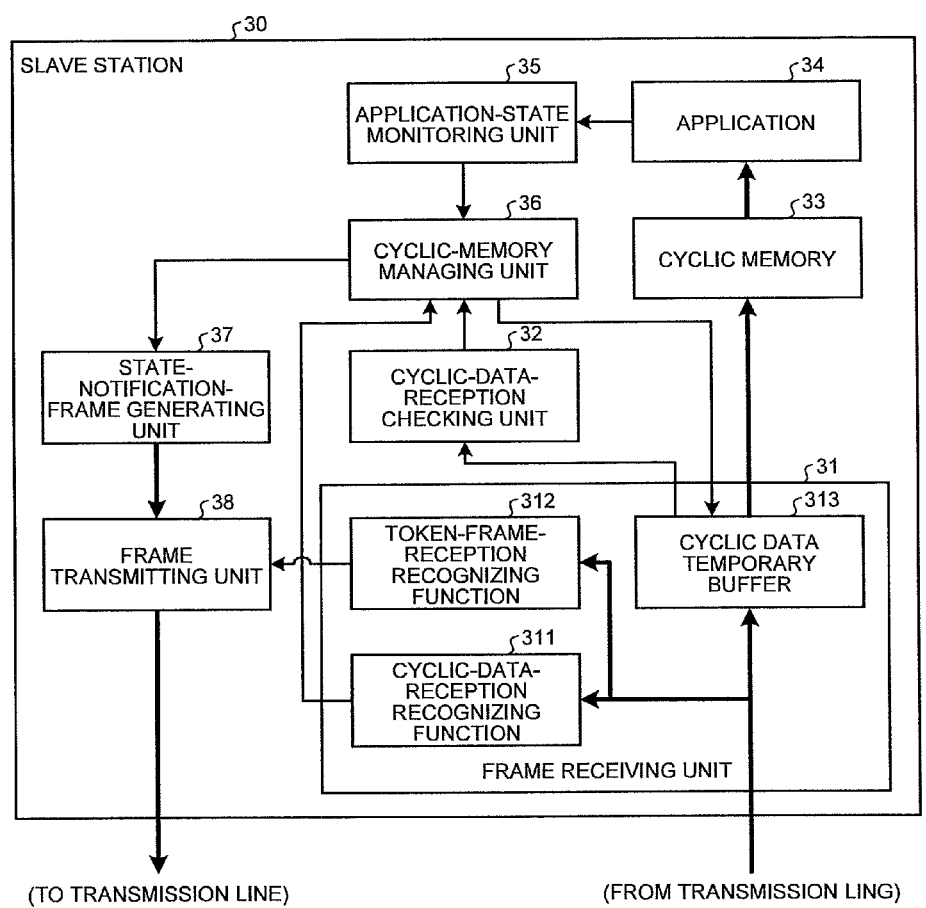
FIG. 2 is a schematic block diagram of a functional configuration of a slave station.

FIG. 2 is a schematic block diagram of a functional configuration of a slave station. A slave station 30 includes a frame receiving unit 31, a cyclic-data-reception checking unit 32, a cyclic memory 33, an application 34, an application-state monitoring unit 35, a cyclic-memory managing unit 36, a state-notification-frame generating unit 37, and a frame transmitting unit 38.

The frame receiving unit 31 performs reception processing for a frame from another communication node such as the master station 10. The frame receiving unit 31 includes a cyclic-data-reception recognizing function 311, a token-frame-reception recognizing function 312, and a cyclic data temporary buffer 313. The cyclic-data-reception recognizing function 311 has a function of extracting data addressed to the own station from received cyclic data and storing the data in the cyclic data temporary buffer 313.

The token-frame-reception recognizing function 312 includes a function of determining, when the slave station 30 receives a token frame, using the token frame, whether the own station has a transmission right. When the token-frame-reception recognizing function 312 recognizes that the own station has the transmission right, the token-frame-reception recognizing function 312 notifies the frame transmitting unit 38 that transmission of a frame is possible.

The cyclic data temporary buffer 313 temporarily stores the data addressed to the own station recognized by the cyclic-data-reception recognizing function 311 in the received cyclic data until the data is stored in the cyclic memory 33 or until the data is discarded.

The cyclic-data-reception checking unit 32 determines whether the data stored in the cyclic data temporary buffer 313 is normal and notifies the cyclic-memory managing unit 36 of a result of the determination as cyclic data reception state information. The cyclic-data-reception checking unit 32 checks, for example, whether data corruption has occurred in the data stored in the cyclic data temporary buffer 313 or whether all data addressed to the own station have been able to be received.

The cyclic memory 33 receives and stores the cyclic data stored in the cyclic data temporary buffer 313 when a condition that the data addressed to the own station has been able to be normally received and the application 34 has issued a permission of data rewriting to the cyclic memory 33 is satisfied as explained later.

The application 34 performs predetermined processing using the received cyclic data according to a computer program. The application 34 also performs processing for transmitting a result obtained by performing the predetermined processing to the master station 10 via the frame transmitting unit 38 as cyclic data. This application 34 corresponds to a computer program executed by a control apparatus such as a programmable controller.

The application-state monitoring unit 35 monitors whether data rewriting permission for the cyclic memory 33 is issued by the application 34. When the data rewriting permission for the cyclic memory 33 is issued, the application-state monitoring unit 35 notifies the cyclic-memory managing unit 36 of the data rewriting permission as data rewriting permission information.

The cyclic-memory managing unit 36 performs processing for transferring the cyclic data addressed to the own station stored in the cyclic data temporary buffer 313 to the cyclic memory 33 only when the cyclic data addressed to the own station has been able to be normally received and the data rewriting permission for the cyclic memory 33 has been issued from the application 34. Specifically, when the cyclic data reception state information obtained from the cyclic-data-reception checking unit 32 is normal and the data rewriting permission information is received from the application-state monitoring unit 35, the cyclic-memory managing unit 36 transfers the cyclic data stored in the cyclic data temporary buffer 313 to the cyclic memory 33.

The cyclic-memory managing unit 36 generates reception state information at the time of receiving the cyclic data addressed to the own station using content of the cyclic data reception state information obtained from the cyclic-data-reception checking unit 32 and presence or absence of the data rewriting permission information and temporarily stores the reception state information.

The reception state information includes data expansion state information "Cyc_set" indicating an expansion state of the cyclic data in the cyclic memory 33 and data processing state information "RX_status" indicating whether the slave station 30 is in a state in which the slave station 30 can process data at the time of receiving the cyclic data. The state in which the slave station 30 can process data at the time of receiving the cyclic data, which is a reference of determination of the data processing state information, means a state in which the application 34 permits expansion of the data into the cyclic memory 33.

Regarding the data expansion state information, when the cyclic data reception state information indicates that the cyclic data is normally received and the cyclic-memory managing unit 36 receives the data rewriting permission information, "1" is set in "Cyc_set". Otherwise, "0" is set in "Cyc_set".

Regarding the data processing state information, when "Cyc_set" is "0" and the data rewriting permission information is not received, "0" is set in "RX_status". When the data rewriting permission information is received, "1" is set in "RX_status". In other words, the data processing state information indicates presence or absence of reception of the data rewriting permission information by the cyclic-memory managing unit 36.

The state-notification-frame generating unit 37 performs processing for generating a state notification frame using the reception state information created by the cyclic-memory managing unit 36. The state notification frame is a frame for informing the master station 10 of a state of the slave station 30 at the time of receiving the cyclic data. The state notification frame notifies whether the cyclic data has been expanded into the cyclic memory 33 and the slave station 30 has been in the state in which the slave station 30 can process data at the time of receiving the cyclic data.

When the frame transmitting unit 38 receives notification to the effect that the own station has the transmission right for a frame from the token-frame-reception recognizing function 312 of the frame receiving unit 31, the frame transmitting unit 38 transmits the state notification frame generated by the state-notification-frame generating unit 37 to the master station 10 and transmits the cyclic data generated by the application 34 to the master station 10.

Figure 3:
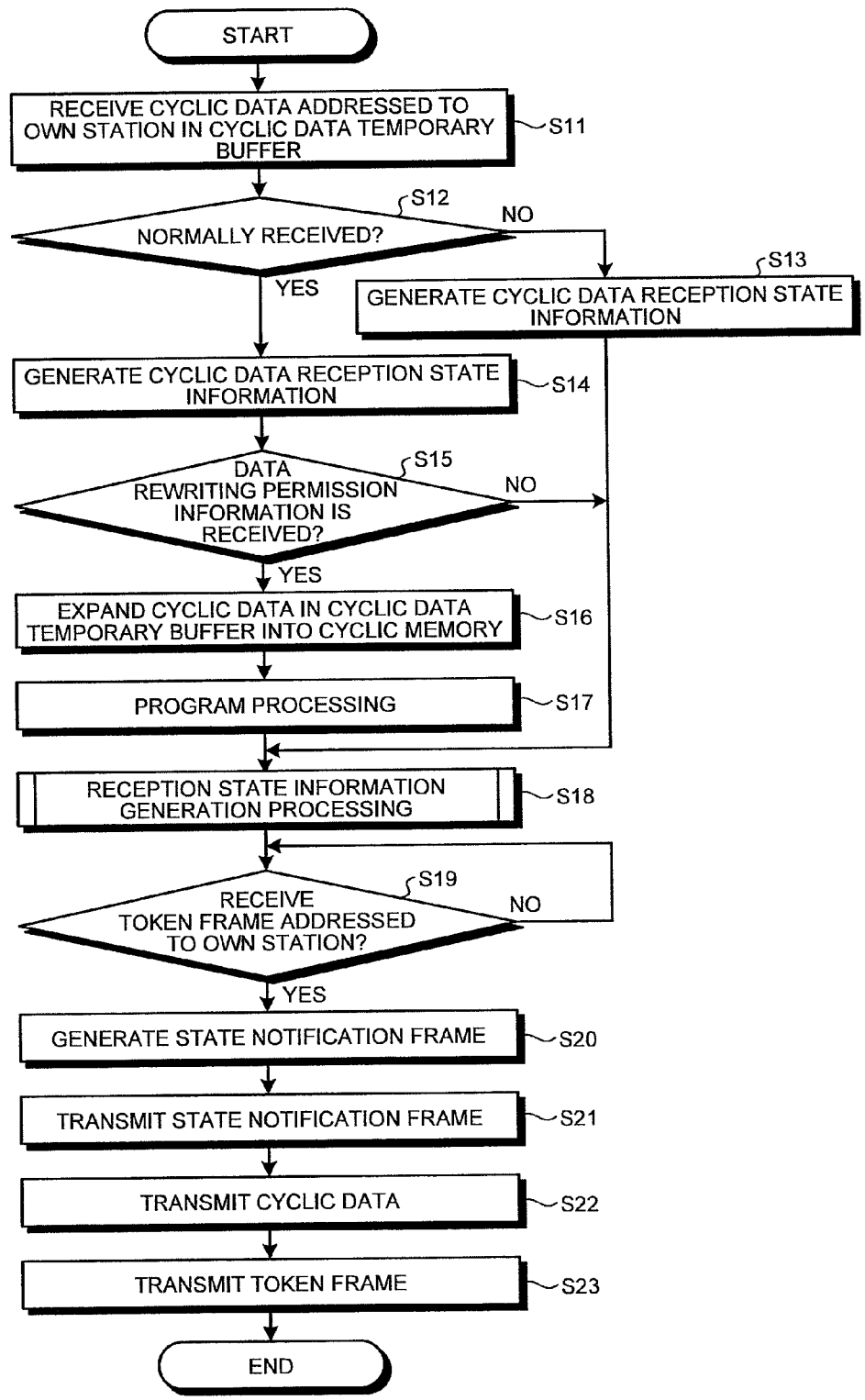
FIG. 3 is a flowchart explaining an example of a procedure of transmission and reception processing for a frame by the slave station.

Transmission and reception processing for a frame by the slave station 30 is explained. FIG. 3 is a flowchart explaining an example of a procedure of the transmission and reception processing for a frame by the slave station. First, when the frame receiving unit 31 receives cyclic data from the master station 10, the cyclic-data-reception recognizing function 311 acquires cyclic data addressed to the own station from a predetermined frame and stores the cyclic data in the cyclic data temporary buffer 313 (step S11). At this point, the cyclic-data-reception checking unit 32 determines whether the cyclic data stored in the cyclic data temporary buffer 313 has been able to be normally received (step S12). For example, the cyclic-data-reception checking unit 32 performs inspection and determines whether all data addressed to the own station have been able to be received and whether data corruption has occurred.

When the cyclic data has not been able to be normally received (No at step S12), the cyclic-data-reception checking unit 32 generates the cyclic data reception state information indicating that the cyclic data has not been able to be normally received (step S13) and notifies the cyclic-memory managing unit 36 of the cyclic data reception state information. On the other hand, when the cyclic data has been able to be normally received (Yes at step S12), the cyclic-data-reception checking unit 32 generates the cyclic data reception state information indicating that the cyclic data has been able to be normally received (step S14) and notifies the cyclic-memory managing unit 36 of the cyclic data reception state information.

The application-state monitoring unit 35 always monitors whether the application 34 issues permission for data rewriting for the cyclic memory 33. When the permission for data rewriting is issued from the application 34, the application-state monitoring unit 35 outputs the data rewriting permission information to the cyclic-memory managing unit 36.

After receiving the cyclic data at step S11, the cyclic-memory managing unit 36 determines whether the data rewriting permission information is received from the application-state monitoring unit 35 (step S15).

When the cyclic data has been able to be normally received (Yes at step S12) and the data rewriting permission information is received (Yes at step S15), the cyclic-memory managing unit 36 expands the cyclic data, which is stored in the cyclic data temporary buffer 313, into the cyclic memory 33 (step S16). Thereafter, program processing by the application 34 (step S17) is performed.

Thereafter, after step S13 or when the cyclic data has been able to be normally received (Yes at step S12) and when the data rewriting permission information is not received (No at step S15), reception state information generation processing by the cyclic-memory managing unit 36 (step S18) is performed.

Figure 4:
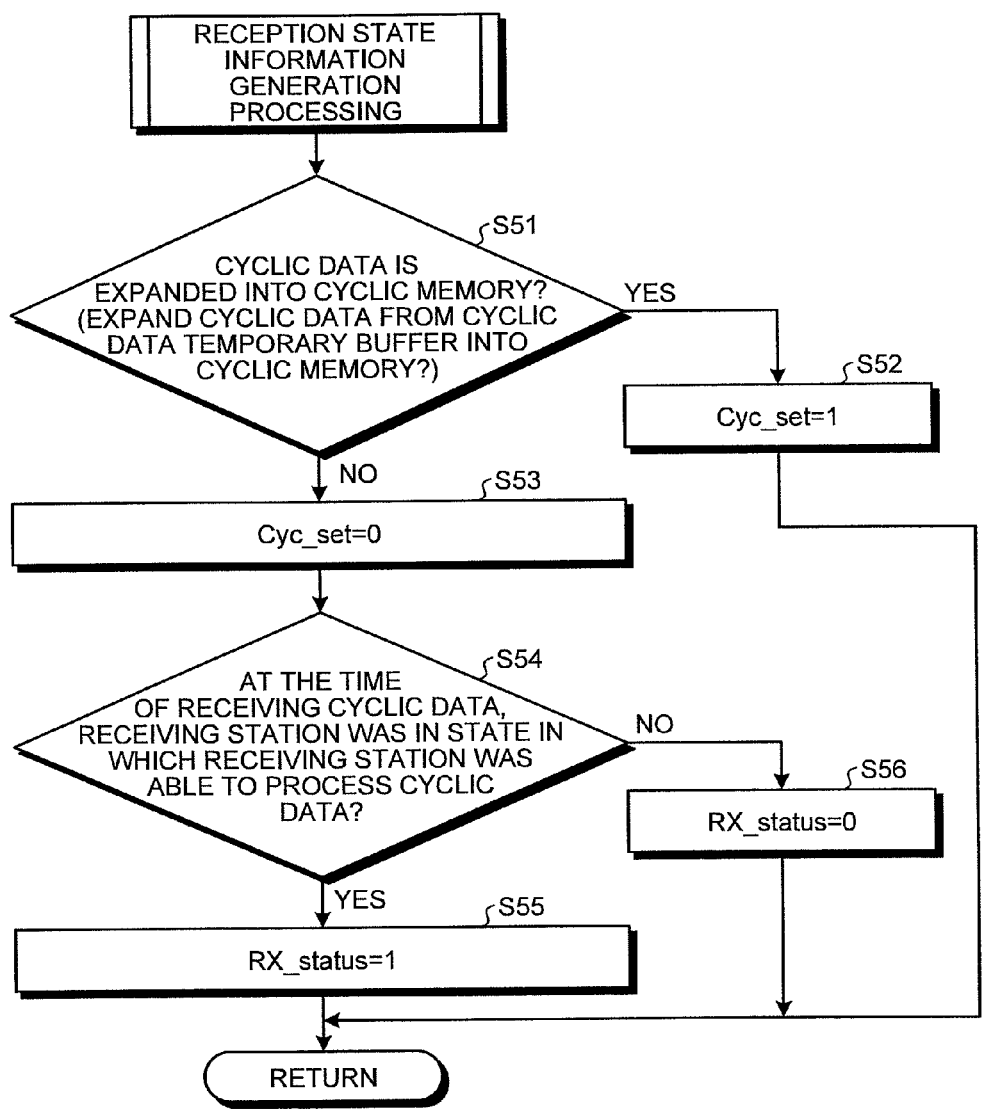
FIG. 4 is a flowchart explaining an example of a procedure of reception state information generation processing.

Details of the reception state information generation processing are explained. FIG. 4 is a flowchart explaining an example of a procedure of the reception state information generation processing. The cyclic-memory managing unit 36 determines, based on the cyclic data reception state information acquired from the cyclic-data-reception checking unit 32 and the data rewriting permission information acquired from the application-state monitoring unit 35, whether the cyclic data is expanded into the cyclic memory 33 (step S51). When the cyclic data is expanded into the cyclic memory 33 (Yes at step S51), i.e., the cyclic data reception state information is normal and the data rewriting permission information is received, the cyclic-memory managing unit 36 sets "1" in the data expansion state information "Cyc_set" (step S52). The processing ends and returns to the flowchart of FIG. 3.

On the other hand, when the cyclic data is not expanded into the cyclic memory 33 (No at step S51), i.e., when the cyclic data reception state information is abnormal or the data rewriting permission information is not received, the cyclic-memory managing unit 36 sets "0" in the data expansion state information "Cyc_set" (step S53).

Thereafter, the cyclic-memory managing unit 36 determines, based on the data rewriting permission information acquired from the application-state monitoring unit 35, whether the own station (the receiving station) was in the state in which the own station was able to process the cyclic data at the time of receiving the cyclic data (step S54). The state in which the own station was able to process the cyclic data means a case in which the data rewriting permission information was received.

When the own station (the receiving station) was in the state in which the own station was able to process the cyclic data at the time of receiving the cyclic data (Yes at step S54), i.e., when the data rewriting permission information was received, the own station could not receive the cyclic data, although the own station was in a state in which the own station was able to receive the cyclic data. Therefore, the cyclic-memory managing unit 36 sets "1" indicating abnormality in the data processing state information "RX_status" (step S55). The processing returns to the flowchart of FIG. 3.

When the own station (the receiving station) was not in the state in which the own station was able to process the cyclic data at the time of receiving the cyclic data (No at step S54), i.e., when the data rewriting permission information was not received, the slave station 30 was in a state in which the slave station 30 was not able to receive the cyclic data. Therefore, the cyclic-memory managing unit 36 sets "0" indicating normality in the data processing state information "RX_status" (step S56). The processing returns to the flowchart of FIG. 3. As explained above, reception state information is generated. The generated reception state information is stored.

Referring back to FIG. 3, when the reception state information generation processing at step S18 ends, the token-frame-reception recognizing function 312 of the frame receiving unit 31 determines whether the slave station 30 receives a token frame addressed to the own station (step S19). When the slave station 30 does not receive a token frame addressed to the own station (No at step S19), the slave station 30 is in a waiting state until the slave station 30 receives a token frame addressed to the own station. When the slave station 30 receives a token frame addressed to the own station (Yes at step S19), the state-notification-frame generating unit 37 generates a state notification frame including the reception state information generated in the reception state information generation processing at step S18 (step S20). The frame transmitting unit 38 transmits the state notification frame (step S21).

Thereafter, the frame transmitting unit 38 transmits the cyclic data generated by the application 34 to the master station 10 (step S22). Thereafter, the frame transmitting unit 38 transmits the token frame to a communication node having the transmission right next (step S23). The transmission and reception processing for the data frame by the slave station 30 ends.

Figure 5:
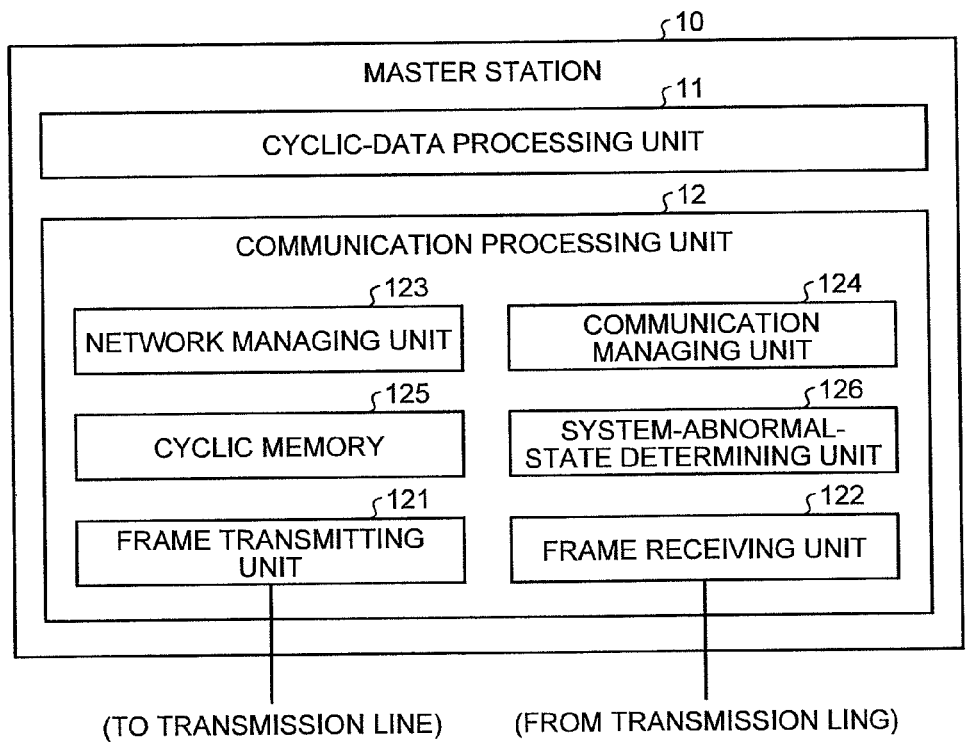
FIG. 5 is a block diagram of an example of a functional configuration of a master station.

FIG. 5 is a block diagram of an example of a functional configuration of the master station. The master station 10 includes a cyclic-data processing unit 11 that performs a predetermined arithmetic operation using cyclic data received from the slave station 30 and generates cyclic data to be transmitted to the slave station 30 and a communication processing unit 12 that performs, for example, processing for establishing transmission order for a token frame and transmission and reception processing for a frame including the cyclic data to and from the slave station 30 in the same segment via a port.

The communication processing unit 12 includes a frame transmitting unit 121, a frame receiving unit 122, a network managing unit 123, a communication managing unit 124, a cyclic memory 125, and a system-abnormal-state determining unit 126. The frame transmitting unit 121 has a function of transmitting a frame generated by the network managing unit 123 and transmitting a frame generated by the cyclic-data processing unit 11 when the own station as the transmission right for a frame. The frame receiving unit 122 has a function of performing reception processing for a frame addressed to the own station.

The network managing unit 123 performs processing for recognizing a communication node connected to a network of the same segment, determining transmission order for a token frame, and performing communication using the token frame. The communication managing unit 124 determines transmission order of the token frame, i.e., whether the own station has the transmission right and manages transmission of a frame by the frame transmitting unit 121.

Figure 6:
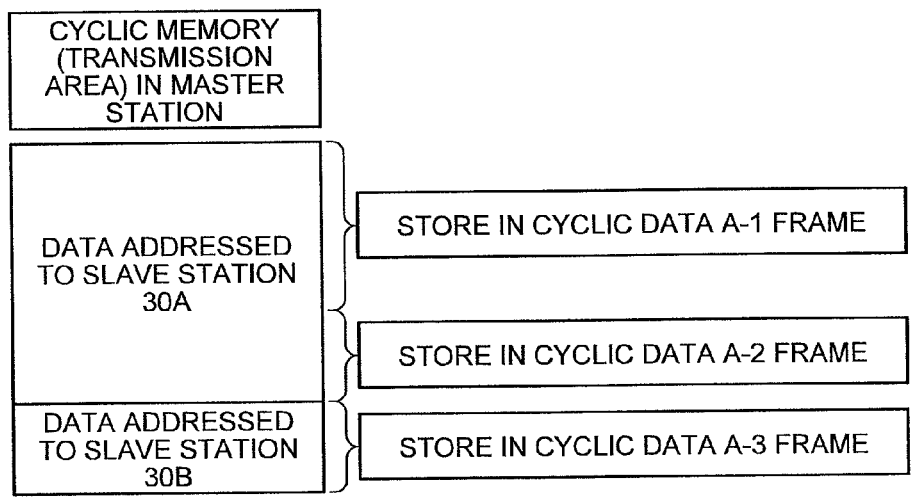
FIG. 6 is a schematic diagram of an example of a transmission area of a cyclic memory of the master station.

The cyclic memory 125 is a memory that stores cyclic data transmitted and received by the frame transmitting unit 121 and the frame receiving unit 122. FIG. 6 is a schematic diagram of an example of a transmission area of the cyclic memory of the master station. In this example, as shown in FIG. 1, the communication system 1 includes the one master station 10 and the two slave stations 30A and 30B. A data volume of cyclic data addressed to the slave station 30A is larger than a data volume of cyclic data addressed to the slave station 30B. An area allocated to the slave station 30A is larger. As a result, data addressed to the slave station 30A is stored in a cyclic data A-1 frame and a cyclic data A-2 frame and data addressed to the slave station 30B is stored in a cyclic data A-3 frame. Sizes of data addressed to the slave stations 30, 30 are determined every time. A place where the data is stored in a data frame (in which data frame from the top the data is stored) is decided in advance.

The system-abnormal-state determining unit 126 performs processing for determining, using data expansion state information and data processing state information of state notification frames transmitted from the slave stations 30, whether the communication system is in an abnormal state in which the communication system requires immediate repair and check or in a normal state in which the communication system does not require repair and check. Specifically, when the slave station 30 was able to normally receive cyclic data addressed to the slave station 30 and expanded the cyclic data into the cyclic memory 33 or the slave station 30 did not expand the cyclic data into the cyclic memory 33 and was not in a state in which the slave station 30 was able to receive the cyclic data, the system-abnormal-state determining unit 126 determines that the slave station 30 is normal as a system. When the slave station 30 did not expand the cyclic data into the cyclic memory 33 and was in a state in which the slave station 30 was able to receive the cyclic data, the system-abnormal-state determining unit 126 determines that the slave station 30 is abnormal as a system. When the slave station 30 is determined as abnormal as a system, the system-abnormal-state determining unit 126 can display and output to that effect on display means such as a display device connected to the master station 10 or can notify, through a network, a terminal apparatus, which is used by an administrator, of an email or the like to the effect that the communication system is abnormal.

When the system-abnormal-state determining unit 126 receives the state notification frames from the slave stations 30, the system-abnormal-state determining unit 126 stores the state notification frames. When the system-abnormal-state determining unit 126 receives a token frame set to give the transmission right to the own station, the system-abnormal-state determining unit 126 performs the determination processing explained above.

Figure 7:
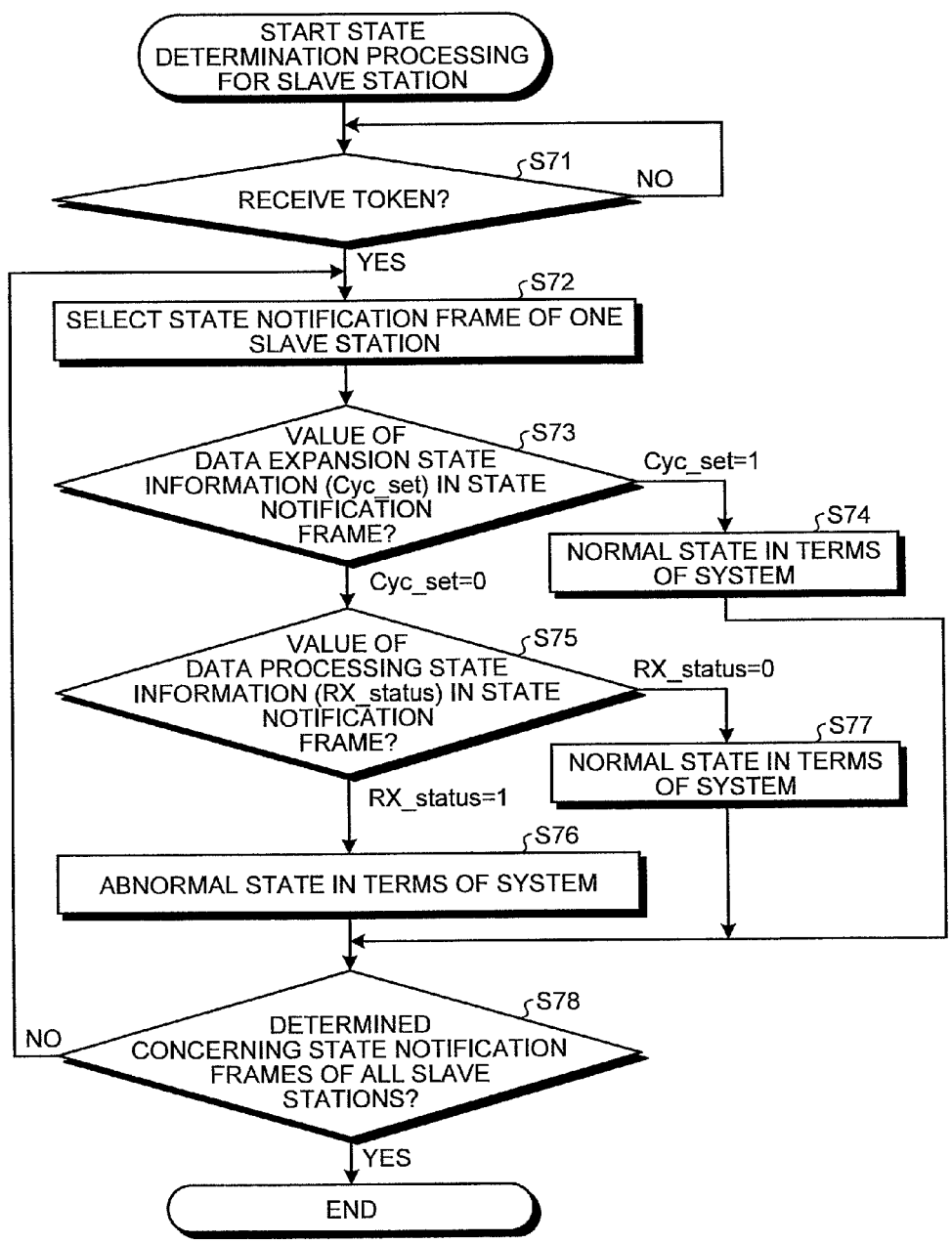
FIG. 7 is a flowchart explaining an example of a procedure of state determination processing of station determination processing for the slave station by the master station.

Determination processing for an abnormal state of the communication system by the master station 10 is explained. FIG. 7 is a flowchart explaining an example of a procedure of state determination processing for the slave stations by the master station. It is assumed that the master station 10 has received state notification frames transmitted from the slave stations 30 and has stored contents of the state notification frames in a memory.

First, the communication managing unit 124 of the master station 10 determines whether the master station 10 receives a token frame addressed to the own station (step S71). When the master station 10 does not receive a token frame addressed to the own station (No at step S71), the master station 10 is in a waiting state until the master station 10 receives a token frame addressed to the own station.

When the master station 10 receives a token frame addressed to the own station (Yes at step S71), the system-abnormal-state determining unit 126 selects the state notification frame of one slave station 30 out of the state notification frames stored in the memory (step S72). The system-abnormal-state determining unit 126 acquires a value of data expansion state information (Cyc_set) of the state notification frame of the slave station 30 and determines whether the value is "1" or "0" (step S73).

When the value of the data expansion state information Cyc_set of the state notification frame is "1", the slave station 30 has been able to normally receive data addressed to the own station and the application 34 has given data rewriting permission for the cyclic memory 33 to the slave station 30, the system-abnormal-state determining unit 126 determines that the slave station 30 is in a normal state as a system (step S74).

On the other hand, when the value of the data expansion state information Cyc_set of the state notification frame is "0", the slave station 30 has not been able to normally receive data addressed to the own station or the application 34 has not issued data rewriting permission for the cyclic memory 33. Therefore, the system-abnormal-state determining unit 126 further determines whether the slave station 30 was in a state in which the slave station 30 was able to process cyclic data. In other words, the system-abnormal-state determining unit 126 determines whether a value of the data processing state information (RX status) in the state notification frame is "0" or "1" (step S75).

When the value of the data processing state information RX_status of the state notification frame is "1", the slave station 30 was in the state in which the slave station 30 was able to receive the cyclic data. In other words, the slave station 30 was not able to receive the cyclic data, although the slave station 30 was in the state in which the slave station was able to receive the cyclic data. Therefore, the system-abnormal-state determining unit 126 determines that the slave station 30 is in a abnormal state as a system (step S76). When the system-abnormal-state determining unit 126 determines at step S76 that the slave station 30 is abnormal as a system, the system-abnormal-state determining unit 126 performs output to the effect that the slave station 30 is abnormal.

When the value of the data processing state information RX_status of the state notification frame is "0", the slave station 30 was in a state in which the slave station 30 was not able to receive the cyclic data. In other words, the slave station 30 was in a state in which the slave station 30 was not able to expand the cyclic data into the cyclic memory 33 and was not able to receive the cyclic data. In such a case, for example, the slave station 30 inferior in a processing ability compared with the slave station 30 having the highest processing performance in the communication system is in a state in which, for example, processing of the slave station 30 simply cannot catch up with a transmission period of the cyclic data of the master station 10 in terms of performance. Therefore, the system-abnormal-state determining unit 126 determines that the slave station 30 does not have a problem related to its own system and is in a normal state (step S77).

After steps S74, S76, and S77, the system-abnormal-state determining unit 126 determines whether the processing has been performed for the state notification frames of all the slave stations 30 stored in the memory (step S78). When the processing has not been performed for the state notification frames of all the slave stations 30 (No at step S78), the processing returns to step S72. When the processing has been performed for the state notification frames of all the slave stations 30 (Yes at step S78), the processing ends.

Figure 8:
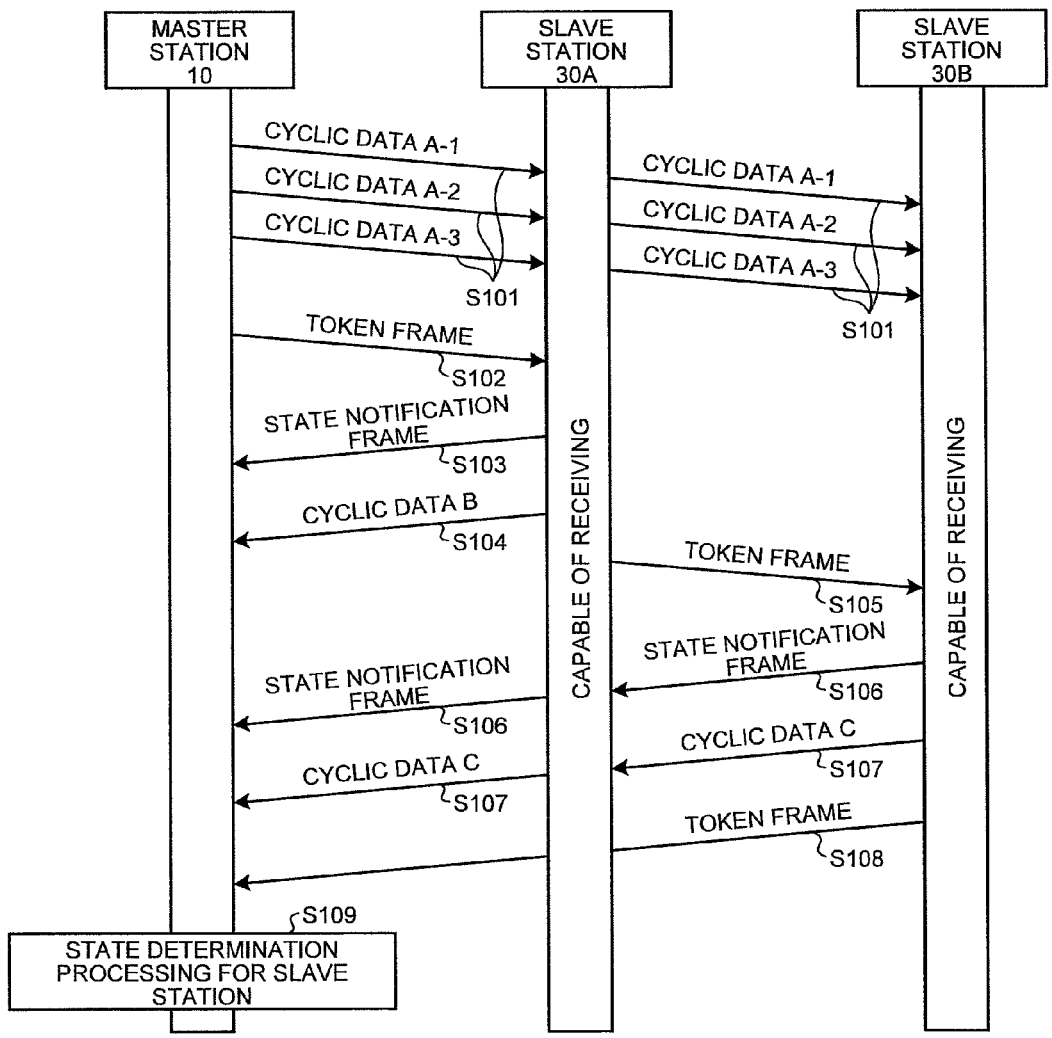
FIG. 8 is a sequence chart explaining an example of a communication method according to the first embodiment.

Determination processing concerning whether the communication system is normal related to its own system is explained with reference to a specific example. FIG. 8 is a sequence chart explaining an example of a communication method according to the first embodiment. In an example explained below, a token frame is circulated in the order of the master station 10, the slave station 30A, the slave station 30B, and the master station 10 in the system shown in FIG. 1. In FIG. 8, it is assumed that both the slave stations 30A and 30B are in a state in which the slave stations 30A and 30B can receive cyclic data at the time of receiving the cyclic data.

First, the master station 10 generates a cyclic data frame in which cyclic data A-1 to A-3 in a transmission area of the cyclic memory 125 of the own station are stored and outputs the cyclic data frame from the frame transmitting unit 121 (step S101). A cyclic data A-1 frame and a cyclic data A-2 frame addressed to the slave station 30A and a cyclic data A-3 frame addressed to the slave station 30B are output and transmitted to the slave stations 30A and 30B.

The slave stations 30A and 30B acquire data addressed to the own stations in the cyclic data frames and stores the data in the cyclic data temporary buffers 313. The slave station 30A acquires the cyclic data A-1 and A-2 and stores the cyclic data A-1 and A-2 in the cyclic data temporary buffer 313. The slave station 30B acquires the cyclic data A-3 and stores the cyclic data A-3 in the cyclic data temporary buffer 313. The cyclic-data-reception checking units 32 of the slave stations 30A and 30B determine whether the cyclic data have been able to be normally stored in the cyclic data temporary buffers 313 and notify the cyclic-memory managing units 36 of the cyclic data reception state information, which is a result of the determination.

When the rewriting permission for the cyclic memories 33 has been issued from the applications 34, the application-state monitoring units 35 notify the cyclic-memory managing units 36 to that effect. It is a precondition that both the slave stations 30A and 30B are in the state in which the slave stations 30A and 30B can receive the cyclic data at the time of receiving the cyclic data. Therefore, the application-state monitoring units 35 output the data rewriting permission information to the cyclic-memory managing units 36. Consequently, the slave stations 30A and 30B expand the cyclic data, which is stored in the cyclic data temporary buffers 313, into the cyclic memories 33.

The cyclic-memory managing units 36 of the slave stations 30A and 30B create reception state information based on the cyclic data reception state information and the data rewriting permission information. For example, when all cyclic data addressed to the own stations have been normally received and expanded into the cyclic memories 33, the cyclic-memory managing units 36 store the data expansion state information Cyc_set as "1". Because the slave stations 30A and 30B were in the state in which the slave stations 30A and 30B were able to receive the cyclic data addressed to the own stations at the time of receiving the cyclic data, the cyclic-memory managing units 36 store the data processing state information RX_status as "1".

When the cyclic data addressed to the own stations were not able to be normally received, for example, when the slave station 30A was able to receive only the cyclic data A-1 or when received cyclic data was corrupted, the slave station 30A does not expand the cyclic data into the cyclic memory 33. Therefore, the cyclic-memory managing units 36 store the data expansion state information Cyc_set as "0". At this point, because the slave stations 30A and 30B were in the state in which the slave stations 30A and 30B were able to receive the cyclic data addressed to the own stations at the time of receiving the cyclic data, the cyclic-memory managing units 36 store the data processing state information RX_status as "1".

It is assumed that both the slave stations 30A and 30B have been able to expand the cyclic data into the cyclic memories 33 and, as reception state information, the cyclic-memory managing units 36 have stored the data expansion state information Cyc_set as "1" and have stored the data processing station information RX_status as "1".

After transmitting the cyclic data, the master station 10 passes the token frame to the slave station 30A (step S102). After the slave station 30A receives the token frame and recognizes that the own station has the transmission right, the state-notification-frame generating unit 37 of the slave station 30A sets the values of the data expansion state information Cyc_set and the data processing state information RX_status, which are temporarily stored by the cyclic-memory managing unit 36, in a state notification frame and transmits the state notification frame to the master station 10 (step S103). The state-notification-frame generating unit 37 transmits cyclic data B generated by the application 34 to the master station 10 as well (step S104).

After transmitting the cyclic data, the slave station 30A passes the token frame to the slave station 30B (step S105). After the slave station 30B receives the token frame and recognizes that the own station has the transmission right, the state-notification-frame generating unit 37 of the slave station 30B sets the values of the data expansion state information Cyc_set and the data processing state information RX_status, which are temporarily stored by the cyclic-memory managing unit 36, in a state notification frame and transmits the state notification frame to the master station 10 (step S106). The state-notification-frame generating unit 37 transmits cyclic data C generated by the application 34 to the master station 10 as well (step S107).

After transmitting the cyclic data C, the slave station 30B passes the token frame to the master station 10 (step S108). The master station 10 receives the token frame and recognizes that the own station has the transmission right. By the time when the master station 10 receives the token frame addressed to the own station, the master station 10 has received state notification frames from all the communication nodes (the slave stations 30A and 30B) present in the communication system. The master station 10 that receives the token frame performs state determination processing for the slave stations 30 according to the flowchart of FIG. 7 (step S109). Because the data expansion state information Cyc_set is "1" in both the slave stations 30A and 30B, the master station 10 recognizes that a problem related to its own system has not occurred. The processing explained above is periodically repeatedly executed.

Figure 9:
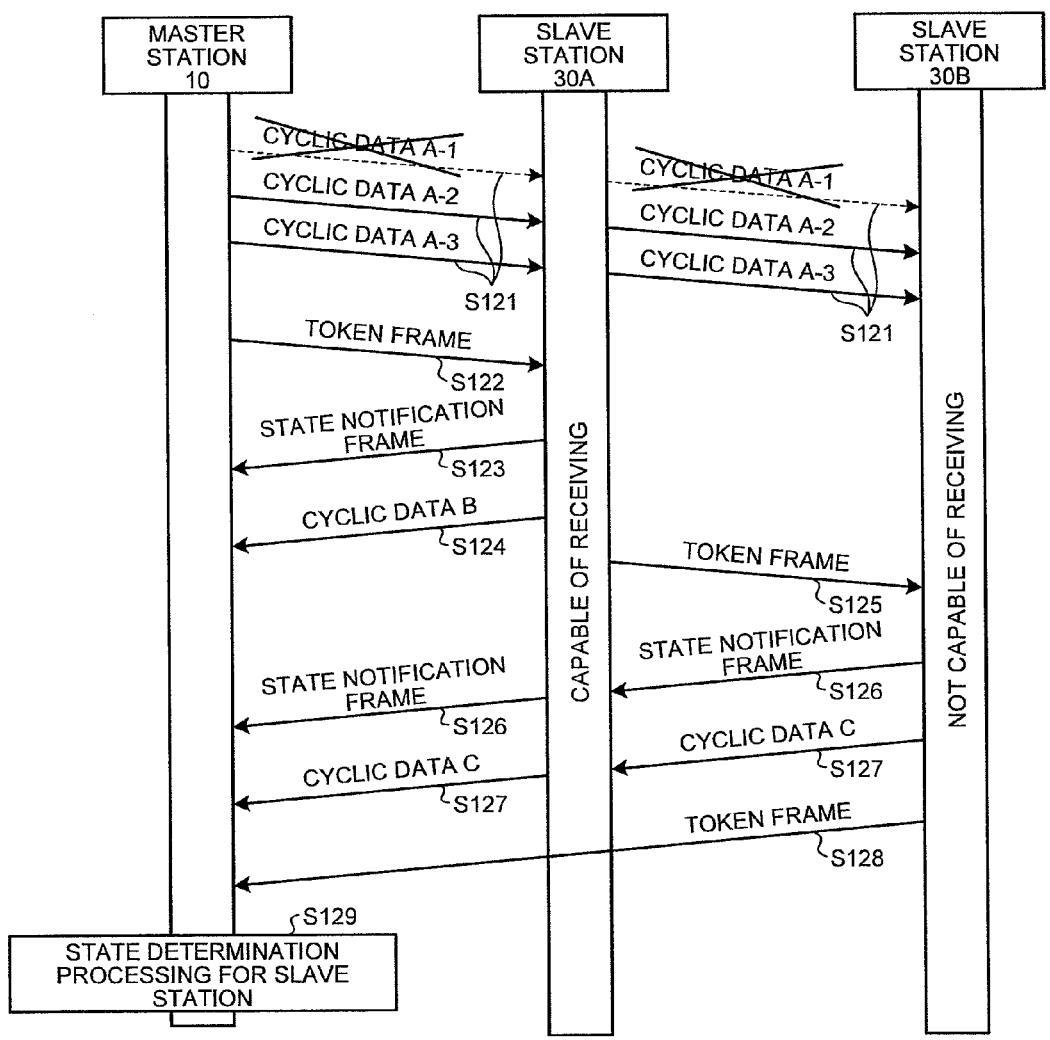
FIG. 9 is a sequence chart explaining another example of the communication method according to the first embodiment.

FIG. 9 is a sequence chart explaining another example of the communication method according to the first embodiment. As in the sequence chart shown in FIG. 8, it is assumed that a token frame is circulated in the order of the master station 10, the slave station 30A, the slave station 30B, and the master station 10 in the system shown in FIG. 1. In FIG. 9, it is assumed that, at the time of receiving cyclic data, the slave station 30A is in a state in which the slave station 30A can receive the cyclic data but the slave station 30B is in a state in which the slave station 30B cannot receive the cyclic data.

First, the master station 10 generates a cyclic data frame in which the cyclic data A-1 to A-3 in a transmission area of the cyclic memory 33 of the own station are stored and outputs the cyclic data frame from the transmitting unit (step S121). As in FIG. 8, the cyclic data A-1 frame and the cyclic data A-2 frame addressed to the slave station 30A and the cyclic data A-3 frame addressed to the slave station 30B are output and transmitted to the slave stations 30A and 30B. It is assumed that data of the cyclic data A-1 frame is corrupted because of the influence of noise on the transmission line at a point of the transmission by the master station 10 and the cyclic data A-1 frame does not reach the slave stations 30A and 30B.

The slave stations 30A and 30B acquire data addressed to the own stations in the cyclic data A-1 to A-3 and store the data in the cyclic data temporary buffers 313. The slave station 30A acquires the cyclic data A-2 and stores the cyclic data A-2 in the cyclic data temporary buffer 313. The slave station 30B acquires the cyclic data A-3 and stores the cyclic data A-3 in the cyclic data temporary buffer 313. The cyclic-data-reception checking units 32 of the slave stations 30A and 30B determine whether the cyclic data have been able to be normally stored in the cyclic data temporary buffers 313 and notify the cyclic-memory managing units 36 of the cyclic data reception state information, which is a result of the determination. The slave station 30A generates the cyclic data reception state information indicating that the cyclic data has not been able to be normally received. The slave station 30B generates the cyclic data reception state information indicating that the cyclic data has been able to be normally received.

When rewriting permission for the cyclic memories 33 has been issued from the applications 34, the application-state monitoring units 35 notify the cyclic-memory managing units 36 to that effect. It is a precondition that the slave station 30A is in a state in which the slave station 30A can receive the cyclic data at the time of receiving the cyclic data. Therefore, the application-state monitoring unit 35 outputs the data rewriting permission information to the cyclic-memory managing unit 36. However, it is a precondition that the slave station 30B is in a state in which the slave station 30B cannot receive the cyclic data at the time of receiving the cyclic data. Therefore, the data rewriting permission information is not output from the application-state monitoring unit 35. Both the slave stations 30A and 30B do not expand the cyclic data into the cyclic memories 33.

The cyclic-memory managing units 36 of the slave stations 30A and 30B create reception state information based on the cyclic data reception state information and the data rewriting permission information. In the case of the slave station 30A, because the slave station 30A was not able to normally receive the cyclic data, the slave station 30A did not expand the cyclic data into the cyclic memory 33. As a result, the cyclic-memory managing unit 36 stores the data expansion state information Cyc_set as "0". The slave station 30A was in the state in which the slave station 30A was able to receive the cyclic data at the time of receiving the cyclic data addressed to the own station. Therefore, the cyclic-memory managing unit 36 stores the data processing state information RX_status as "1".

In the case of the slave station 30B, the slave station 30B was able to normally receive the cyclic data but was not in the state in which the slave station 30B was able to receive the cyclic data at the time of receiving the cyclic data. As a result, because the slave station 30B did not expand the cyclic data into the cyclic memory 33, the cyclic-memory managing unit 36 stores the data expansion state information Cyc_set as "0". The slave station 30A was in the state in which the slave station 30A was unable to receive the cyclic data addressed to the own station at the time of receiving the cyclic data. Therefore, the cyclic-memory managing unit 36 stores the data processing state information RX_status as "0".

After transmitting the cyclic data, the master station 10 passes the token frame to the slave station 30A (step S122). After the slave station 30A receives the token frame and recognizes that the own station has the transmission right, the state-notification-frame generating unit 37 of the slave station 30A sets the value of the data expansion state information Cyc_set and the data processing state information RX_status, which are temporarily stored by the cyclic-memory managing unit 36, in a state notification frame and transmits the state notification frame to the master station 10 (step S123). The state-notification-frame generating unit 37 transmits the cyclic data B to the master station 10 as well (step S124).

After transmitting the cyclic data, the slave station 30A passes the token frame to the slave station 30B (step S125). After the slave station 30B receives the token frame and recognizes that the own station has the transmission right, the state-notification-frame generating unit 37 of the slave station 30B sets the data expansion state information Cyc_set and the data processing state information RX_status, which are temporarily stored by the cyclic-memory managing unit 36, in a state notification frame and transmits the state notification frame to the master station 10 (step S126). The state-notification-frame generating unit 37 transmits the cyclic data C to the master station 10 as well (step S127).

After transmitting the cyclic data C, the slave station 30B passes the token frame to the master station 10 (step S128). The master station 10 receives the token frame and recognizes that the own station has the transmission right. By the time when the master station 10 receives the token frame addressed to the own station, the master station 10 has received state notification frames from all the communication nodes (the slave stations 30A and 30B) present in the communication system. The master station 10 that receives the token frame performs the state determination processing for the slave station 30 according to the flowchart of FIG. 7 (step S129). The master station 10 determines that the slave station 30A has a problem related to its own system and the slave station 30B does not have a problem related to its own system. The master station 10 outputs information indicating that the slave station 30A has a problem related to its own system to, for example, the administrator.

According to the first embodiment, the slave stations 30 notify the master station 10 of information concerning presence or absence of normal reception of the cyclic data and a processing state of the cyclic data (whether new data from the master station 10 can be reflected during reception processing). Therefore, there is an effect that it is possible to determine, according to a reception state of the cyclic data, whether the slave station 30 has a problem related to its own system component in a network.

For example, when the slave station 30 that cannot receive new data from the master station 10 during processing of data received earlier is present, if the slave station 30 is in a state in which the slave station 30 cannot receive new data from the master station 10 in terms of performance, it is possible to determine that the slave station 30 is normally operating without determining that the slave station 30 has a problem related to its own system (requires urgent maintenance). It is possible to determine whether it is necessary to urgently perform maintenance for non-reception of the cyclic data due to noise, which rarely occurs, in the slave station 30 having an extremely long period of a reception processing time for the cyclic data. Consequently, it is possible to suppress a chance of performing unnecessary maintenance to improve yield and increase the effect of a reduction in cost.

Second Embodiment

In the example explained in the first embodiment, the slave station is in the state in which the slave station can receive at least the cyclic data addressed to the own station. However, in this second embodiment, a communication system and a communication apparatus state determining method that can cope with disappearance on a transmission line of cyclic data addressed to the own station in cyclic data transmitted by a master station are explained.

The configuration of the communication system according to the second embodiment is the same as that in the first embodiment. However, the cyclic-data-reception checking unit 32 of the slave station 30 includes a function of notifying the cyclic-memory managing unit 36 of information concerning an acquisition period of a station state in addition to the cyclic data reception information. For example, it is assumed that, when at least one of cyclic data addressed to the own station from the master station 10 is received, the cyclic-data-reception checking unit 32 sets "1" in a FLAG serving as acquisition period information of a station state and, when no cyclic data addressed to the own station from the master station 10 is received and a token frame addressed to the own station is received, the cyclic-data-reception checking unit 32 sets "2" in the FLAG. In the generation processing for reception state information by the cyclic-memory managing unit 36, processing in the case of FLAG "1" is as explained in the first embodiment. However, in the case of FLAG "2", the cyclic-memory managing unit 36 determines whether the slave station 30 is in a state in which the slave station 30 can receive a token frame addressed to the own station with reference to reception time of the token frame.

Figure 10:
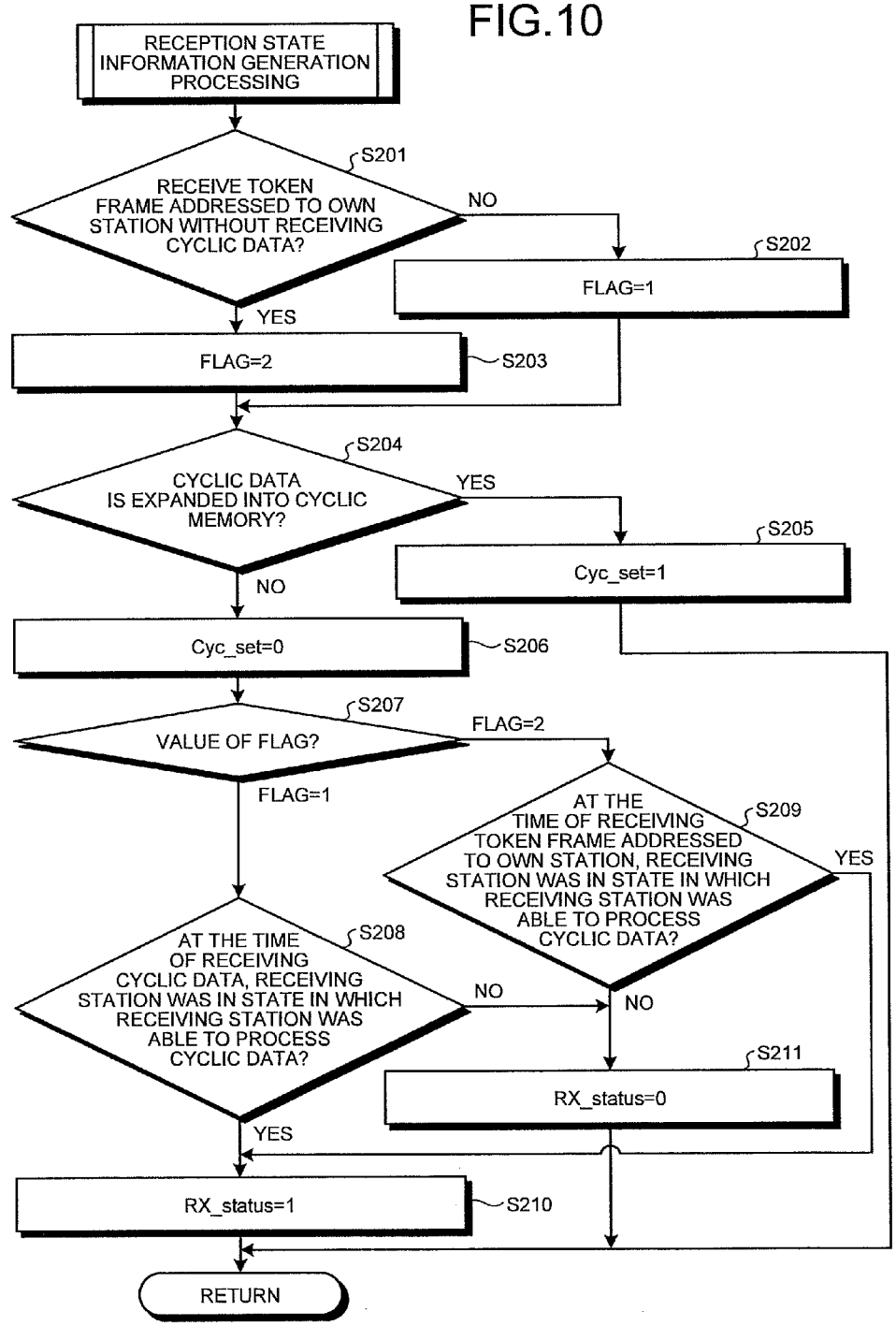
FIG. 10 is a flowchart explaining an example of a procedure of reception state information generation processing by the slave station.

FIG. 10 is a flowchart explaining an example of a procedure of reception state information generation processing by the slave station. First, the cyclic-data-reception checking unit 32 determines whether the slave station receives a token frame addressed to the own station without receiving cyclic data addressed to the own station (step S201). When the slave station receives the cyclic data addressed to the own station (No at step S201), the cyclic-data-reception checking unit 32 sets "1" in the FLAG serving as the acquisition period information of a station state (step S202). When the slave station receives the token frame addressed to the own station without receiving the cyclic data addressed to the own station (Yes at step S201), the cyclic-data-reception checking unit 32 sets "2" in the FLAG serving as the acquisition period information of a station state (step S203). These kinds of information are passed from the cyclic-data-reception checking unit 32 to the cyclic-memory managing unit 36 together with cyclic data reception state information.

The cyclic-memory managing unit 36 determines, based on the cyclic data reception state information and the acquisition period information of a station state acquired from the cyclic-data-reception checking unit 32, whether the cyclic data is expanded into the cyclic memory 33 (step S204). When the cyclic data is expanded into the cyclic memory 33 (Yes at step S204), i.e., the cyclic data reception state information is normal and data rewriting permission information is received, the cyclic-memory managing unit 36 sets "1" in data expansion state information "Cyc_set" (step S205). The processing ends and returns to the flowchart of FIG. 3.

On the other hand, when the cyclic data is not expanded into the cyclic memory 33 (No at step S204), i.e., the cyclic data reception state information is abnormal or when the data rewriting permission information is not received, the cyclic-memory managing unit 36 sets "0" in the data expansion state information "Cyc_set" (step S206).

Thereafter, the cyclic-memory managing unit 36 acquires a value of the FLAG of the acquisition period information of a station state (step S207). When the FLAG is "1", the cyclic-memory managing unit 36 determines, based on the data rewriting permission information acquired from the application-state monitoring unit 35, whether the own station (the receiving station) was in a state in which the own station was able to process the cyclic data at the time of receiving the cyclic data (step S208).

When the FLAG is "2", the cyclic-memory managing unit 36 determines, based on the data rewriting permission information acquired from the application-state monitoring unit 35, whether the own station (the receiving station) was in the state in which the own station was able to process the cyclic data at the time of receiving the token frame addressed to the own station (step S209).

When the own station (the receiving station) was in the state in which the own station was able to process the cyclic data at the time of receiving the cyclic data or the token frame addressed to the own station (Yes at steps S208 and S209), i.e., when the data rewriting permission state is received, the own station was not able to receive the cyclic data, although the own station was in the state in which the own station was able to receive the cyclic data. Therefore, the cyclic-memory managing unit 36 sets "1" in data processing state information "RX_status" (step S210). The processing returns to the flowchart of FIG. 3.

When the own station (the receiving station) was not in the state in which the own station was able to process the cyclic data at the time of receiving the cyclic data or the token frame addressed to the own station (No at steps S208 and S209), i.e., when the data rewriting permission information is not received, the slave station 30 was in a state in which the slave station 30 was not able to receive the cyclic data. Therefore, the cyclic-memory managing unit 36 sets "0" in the data processing state information "RX_status" (step S211). The processing returns to the flowchart of FIG. 3. As explained above, reception state information is generated. The generated reception state information is stored.

Figure 11:
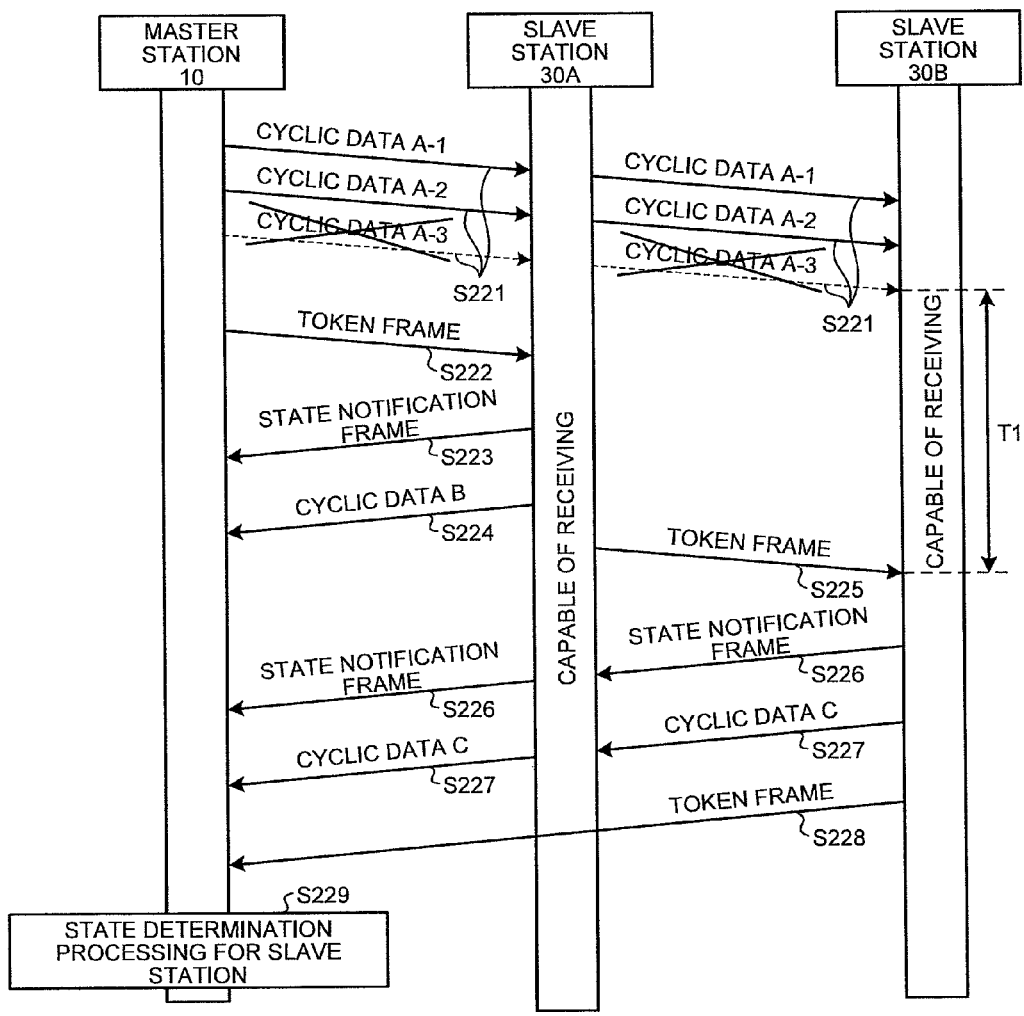
FIG. 11 is a sequence chart explaining an example of a communication method according to a second embodiment.

Determination processing concerning whether the communication system is normal related to its own system is explained with reference to a specific example. FIG. 11 is a sequence chart explaining an example of a communication method according to the second embodiment. In an example explained below, a token frame is circulated in the order of the master station 10, the slave station 30A, the slave station 30B, and the master station 10 in the system shown in FIG. 1. In FIG. 11, it is assumed that both the slave stations 30A and 30B are in a state in which the slave stations 30A and 30B can receive cyclic data at the time of receiving the cyclic data.

First, the master station 10 generates a cyclic data frame in which the cyclic data A-1 to A-3 in the transmission area of the cyclic memory 125 of the own station are stored and outputs the cyclic data frame from the frame transmitting unit 121 (step S301). A cyclic data A-1 frame and a cyclic data A-2 frame addressed to the slave station 30A and a cyclic data A-3 frame addressed to the slave station 30B are output and transmitted to the slave stations 30A and 30B. However, it is assumed that data of the cyclic data A-1 frame, the cyclic data A-2 frame, and the cyclic data A-3 frame are corrupted because of the influence of noise on the transmission line at a point of the transmission by the master station 10 and all the cyclic data A-1 to A-3 are not received by the slave stations 30A and 30B.

The slave stations 30A and 30B acquire data addressed to the own stations in the cyclic data frames and store the data in the cyclic data temporary buffers 313. The slave station 30A acquires the cyclic data A-1 and A-2 and stores the cyclic data A-1 and A-2 in the cyclic data temporary buffer 313. However, because the cyclic data A-3 addressed to the own station disappears, the slave station 30B cannot store the cyclic data in the cyclic data temporary buffer 313.

Thereafter, the cyclic-data-reception checking unit 32 of the slave station 30A determine whether the cyclic data have been able to be normally stored in the cyclic data temporary buffer 313 and notifies the cyclic-memory managing unit 36 of cyclic data reception state information, which is a result of the determination. The slave station 30A generates, together with information indicating that the cyclic data has been able to be normally received, cyclic data reception state information in which "1" is set in the FLAG serving as the acquisition period information of a station state.

When rewriting permission for the cyclic memory 33 has been issued from the application 34, the application-state monitoring unit 35 notifies the cyclic-memory managing unit 36 to that effect. Because it is a precondition that the slave station 30A is in the state in which the slave station 30A can receive the cyclic data at the time of receiving the cyclic data, the application-state monitoring unit 35 outputs the data rewriting permission information to the cyclic-memory managing unit 36.

The cyclic-memory managing unit 36 of the slave station 30A creates reception state information based on the cyclic data reception state information and the data rewriting permission information. The slave station 30A has normally received all cyclic data addressed to the own station and expanded the cyclic data into the cyclic memory 33. Therefore, the cyclic-memory managing unit 36 stores the data expansion state information Cyc_set as "1". The slave station 30A was in the state in which the slave station 30A was able to receive the cyclic data addressed to the own station at the time of receiving the cyclic data. Therefore, the cyclic-memory managing unit 36 stores the data processing state information RX_status as "1". Because the cyclic data and the token frame addressed to the own station do not reach, the cyclic-memory managing unit 36 of the slave station 30B is in a state in which the cyclic-memory managing unit 36 has not created reception state information yet at this point.

After transmitting the cyclic data, the master station 10 passes the token frame to the slave station 30A (step S222). After the slave station 30A receives the token frame and recognizes that the own station has a transmission right, the state-notification-frame generating unit 37 of the slave station 30A sets the values of the data expansion state information Cyc_set and the data processing state information RX_status, which are temporarily stored by the cyclic-memory managing unit 36, in a state notification frame and transmits the state notification frame to the master station 10 (step S223). The state-notification-frame generating unit 37 transmits cyclic data B to the master station 10 as well (step S224).

After transmitting the cyclic data, the slave station 30A passes the token frame to the slave station 30B (step S225). The slave station 30B receives the token frame and recognizes that the own station has the transmission right. Because the slave station 30B has received the token frame addressed to the own station earlier than the cyclic data A-3 addressed to the own station, the cyclic-data-reception checking unit 32 of the slave station 30B generates, together with information indicating that the cyclic data has not been able to be normally received, cyclic data reception state information in which "2" is set in the FLAG serving as the acquisition period information of a station state.

It is a precondition that the slave station 30B is in a state in which the slave station 30B can receive the cyclic data at the time of receiving the cyclic data. Therefore, the application-state monitoring unit 35 outputs the data rewriting permission information to the cyclic-memory managing unit 36.

The cyclic-memory managing unit 36 of the slave station 30B creates reception state information based on the cyclic data reception state information and the data rewriting permission information. Because the slave station 30 was not able to receive the cyclic data addressed to the own station and did not expand the cyclic data into the cyclic memory 33, the cyclic-memory managing unit 36 stores the data expansion state information Cyc_set as "0". Because the slave station 30B was in the state in which the slave station 30B was able to receive the cyclic data addressed to the own station at the time of receiving the cyclic data, the cyclic-memory managing unit 36 stores the data processing state information RX_status as "1".

Thereafter, the state-notification-frame generating unit 37 of the slave station 30B generates a state notification frame indicating a reception state at the point of the reception of the token frame. Specifically, the state-notification-frame generating unit 37 of the slave station 30B sets the values of the data expansion state information Cyc_set and the data processing state information RX_status, which are temporarily stored by the cyclic-memory managing unit 36, in the state notification frame and transmits the state notification frame to the master station 10 (step S226). The state-notification-frame generating unit 37 transmits the cyclic data C to the master station 10 as well (step S227).

After transmitting the cyclic data C, the slave station 30B passes the token frame to the master station 10 (step S228). The master station 10 receives the token frame and recognizes that the own station has the transmission right. By the time when the master station 10 receives the token frame addressed to the own station, the master station 10 has received state notification frames from all the communication nodes (the slave stations 30A and 30B) present in the communication system. The master station 10 that receives the token frame performs state determination processing for the slave stations 30 according to the flowchart of FIG. 7 (step S229). The master station 10 determines that the slave station 30A does not have a problem related to its own system and the slave station 30B has a problem related to its own system.

According to the second embodiment, even when all cyclic data addressed to a certain slave station 30 disappear and do not reach the slave station 30, at a point when the slave station 30 receives a token frame addressed to the slave station 30, information indicating presence or absence of normal reception of the cyclic data and a reception state at the time of receiving the token frame is generated. Therefore, there is an effect that, even when all the cyclic data addressed to the own station disappear, it is possible to determine whether the slave stations 30 have problems related to its own system. There is also an effect that it is possible to determine a state of the slave station 30 even when a switching hub for relaying a frame in a store-and-forward system is present in a network included in the communication system.

Third Embodiment

In the second embodiment, when the slave station cannot receive all the cyclic data addressed to the own station, the slave station generates the reception state information using the token frame addressed to the own station. In this third embodiment, a communication system and a communication apparatus state determining method that can cope with disappearance on a transmission line of all cyclic data transmitted by a master station are explained.

The configuration of the communication system according to the third embodiment is the same as that in the second embodiment. However, it is assumed that the cyclic-data-reception checking unit 32 of the slave station 30 sets "1" in a FLAG serving as acquisition period information of a station state when at least one of cyclic data addressed to the own station from the master station 10 is received and sets "2" in the FLAG when a token frame output by the master station 10 is received before cyclic data from the master station 10 is received. In the generation processing for reception state information by the cyclic-memory managing unit 36, processing in the case of FLAG "1" is as explained in the first embodiment. However, in the case of FLAG "2", the cyclic-memory managing unit 36 determines whether the slave station 30 is in a state in which the slave station 30 can receive a token frame addressed to the own station with reference to the time when the master station 10 issues the token frame.

A procedure of reception state information generation processing by the slave station 30 according to the third embodiment is basically the same as the flowchart shown in FIG. 10 in the second embodiment. However, the procedure is different in that the processing at step S201 is replaced with "receive token frame issued by the master station 10 without receiving cyclic data?" and, in the processing at step S209, "at the time of receiving token frame addressed to own station" is replaced with "when master station 10 issues token frame".

Figure 12:
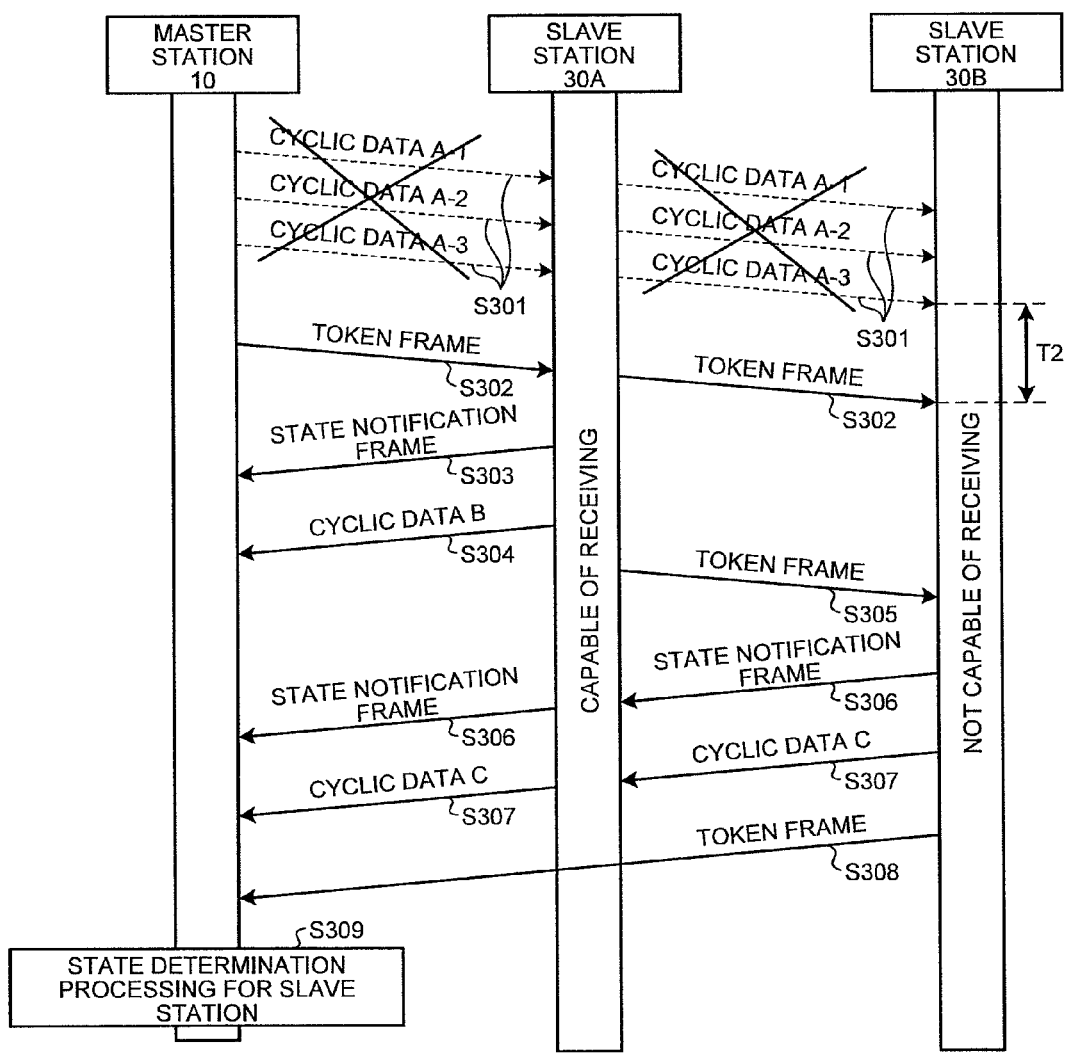
FIG. 12 is a sequence chart explaining an example of a communication method according to a third embodiment.

Determination processing concerning whether the communication system is normal related to its own system is explained with reference to a specific example. FIG. 12 is a sequence chart explaining an example of a communication method according to the third embodiment. In an example explained below, a token frame is circulated in the order of the master station 10, the slave station 30A, the slave station 30B, and the master station 10 in the system shown in FIG. 1. In FIG. 12, it is assumed that the slave station 30A is in a state in which the slave station 30A can receive cyclic data but the slave station 30B is in a state in which the slave station 30B cannot receive cyclic data.

First, the master station 10 generates a cyclic data frame in which the cyclic data A-1 to A-3 in the transmission area of the cyclic memory 125 of the own station are stored and outputs the cyclic data frame from the frame transmitting unit 121 (step S301). A cyclic data A-1 frame and a cyclic data A-2 frame addressed to the slave station 30A and a cyclic data A-3 frame addressed to the slave station 30B are output and transmitted to the slave stations 30A and 30B. However, it is assumed that data of the cyclic data A-1 frame, the cyclic data A-2 frame, and the cyclic data A-3 frame are corrupted because of the influence of noise on the transmission line at a point of the transmission by the master station 10 and all the cyclic data A-1 to A-3 are not received by the slave stations 30A and 30B.

At the normal time, the slave stations 30A and 30B acquire data addressed to the own stations in the cyclic data and stores the data in the cyclic data temporary buffers 313. However, both the slave stations 30A and 30B are in a state in which the cyclic data frames addressed to the own stations disappear. Therefore, the slave stations 30A and 30B cannot store the cyclic data A-1 to A-3 in the cyclic data temporary buffer 313. Therefore, both the slave stations 30A and 30B are in a state in which generation processing for reception state information is not performed.

After transmitting the cyclic data, the master station 10 passes the token frame to the slave station 30A (step S302). The slave station 30A receives the token frame and recognizes that the own station has a transmission right. Because the slave station 30A has received the token frame addressed to the own station earlier than the cyclic data addressed to the own station, the cyclic-data-reception checking unit 32 of the slave station 30A generates, together with information indicating that the cyclic data has not been able to be normally received, cyclic data reception state information in which "2" is set in the FLAG serving as the acquisition period information of a station state.

When rewriting permission for the cyclic memory 33 has been issued from the application 34, the application-state monitoring unit 35 of the slave station 30A notifies the cyclic-memory managing unit 36 to that effect. Because it is a precondition that the slave station 30A is in the state in which the slave station 30A can receive the cyclic data at the time of receiving the cyclic data, the application-state monitoring unit 35 outputs data rewriting permission information to the cyclic-memory managing unit 36.

The cyclic-memory managing unit 36 of the slave station 30A creates reception state information based on the cyclic data reception state information and the data rewriting permission information. Because the slave station 30A was not able to receive the cyclic data addressed to the own station and did not expand the cyclic data into the cyclic memory 33, the cyclic-memory managing unit 36 stores the data expansion state information Cyc_set as "0". Because the slave station 30A was in a state in which the slave station 30A was able to receive the cyclic data addressed to the own station at the time of receiving the cyclic data, the cyclic-memory managing unit 36 stores the data processing state information RX_status as "1".

Thereafter, the state-notification-frame generating unit 37 of the slave station 30A generates a state notification frame at a point when the token frame is issued by the master station 10. Specifically, the state-notification-frame generating unit 37 of the slave station 30A sets the values of the data expansion state information Cyc_set and the data processing state information RX_status, which are temporarily stored by the cyclic-memory managing unit 36, in the state notification frame and transmits the state notification frame to the master station 10 (step S303). The state-notification-frame generating unit 37 transmits the cyclic data B to the master station 10 as well (step S304).

Because the token frame transmitted to the slave station 30A by the master station 10 is transmitted in broadcast, the token frame reaches the slave station 30B as well. Because the slave station 30B has received the token frame issued by the master station 10 earlier than the cyclic data addressed to the own station, the cyclic-data-reception checking unit 32 of the slave station 30B generates, together with information indicating that the cyclic data has not been able to be normally received, cyclic data reception state information in which "2" is set in the FLAG serving as the acquisition period information of a station state.

When the rewriting permission for the cyclic memory 33 has been issued from the application 34, the application-state monitoring unit 35 notifies the cyclic-memory managing unit 36 to that effect. It is a precondition that the slave station 30A is in the state in which the slave station 30A can receive the cyclic data at the time of receiving the cyclic data. Therefore, the application-state monitoring unit 35 outputs the data rewriting permission information to the cyclic-memory managing unit 36.

The cyclic-memory managing unit 36 of the slave station 30B creates reception state information based on the cyclic data reception state information and the data rewriting permission information. Because the slave station 30B was not able to receive the cyclic data addressed to the own station and did not expand the cyclic data into the cyclic memory 33, the cyclic-memory managing unit 36 stores the data expansion state information Cyc_set as "0". Because the slave station 30B was in a state in which the slave station 30B was unable to receive the cyclic data addressed to the own station at the time of receiving the cyclic data, the cyclic-memory managing unit 36 stores the data processing state information RX_status as "0".

Thereafter, after transmitting the cyclic data B, the slave station 30A passes the token frame to the slave station 30B (step S305). After the slave station 30B receives the token frame and recognizes that the own station has the transmission right, the state-notification-frame generating unit 37 of the slave station 30B generates a state notification frame at a point when the master station 10 issues the token frame. Specifically, the state-notification-frame generating unit 37 of the slave station 30B sets the values of the data expansion state information Cyc_set and the data processing state information RX_status, which are temporarily stored by the cyclic-memory managing unit 36, in the state notification frame and transmits the state notification frame to the master station 10 (step S306). The state-notification-frame generating unit 37 transmits the cyclic data C to the master station 10 as well (step S307).

After transmitting the cyclic data C, the slave station 30B passes the token frame to the master station 10 (step S308). The master station 10 receives the token frame and recognizes that the own station has the transmission right. By the time when the master station 10 receives the token frame addressed to the own station, the master station 10 has received state notification frames from all the communication nodes (the slave stations 30A and 30B) present in the communication system. The master station 10 that receives the token frame performs state determination processing for the slave stations 30 according to the flowchart of FIG. 7 (step S309). The master station 10 determines that the slave station 30A has a problem related to its own system and the slave station 30B does not have a problem related to its own system.

The cyclic data temporary buffer 313 can store all cyclic data transmitted by the master station 10. At a point when the slave station 30 receives cyclic data transmitted after cyclic data addressed to the own station, the slave station 30 can determine that the cyclic data addressed to the own station does not normally reach the own station and determine a reception state of the own station. In this case, it is necessary to increase the capacity of the cyclic data temporary buffer 313. However, it is possible to reduce time for determining that the cyclic data addressed to the own station does not reach the own station to be shorter than that in the example explained above.

In the second embodiment, when the slave station 30 cannot receive the cyclic data addressed to the own station at all, at the point when the slave station 30 receives the token frame addressed to the own station, the slave station 30 determines that the cyclic data addressed to the own station does not normally reach the own station and determines a reception state of the own station. However, as in the third embodiment, the slave station 30 can determine that the cyclic data addressed to the own station does not normally reach the own station and determine a reception state of the own station at a point when the slave station 30 receives the token frame issued by the master station 10.

According to the third embodiment, the slave station 30 determines, triggered by the reception of the token frame issued by the master station 10 before the reception of the cyclic data, whether the cyclic data addressed to the own station is normally received and determines a reception state of the own station at the time of issuance of the token frame. Therefore, even when all cyclic data output from the master station 10 disappear on the transmission line, it is possible to determine whether the slave stations 30 have problems related to its own system. There is also an effect that, when a switching hub for relaying a frame in a store-and-forward system is present in a network included in the communication system, it is possible to determine a state of the slave station 30 even if data corrupted by the switching hub is discarded.

Further, when the cyclic data addressed to the own station does not reach the slave station 30, the slave station 30 creates the reception state information at the point when the slave station 30 receives the token frame issued by the master station 10. Therefore, there is also an effect that it is possible to set time T2 (FIG. 12) for the slave station 30 to recognize that the cyclic data disappears short compared with time T1 (FIG. 11) in the second embodiment.

Fourth Embodiment

In the first to third embodiments, the master station determines, using the state notification frame from the slave station, whether the slave station is normal as a system. When the slave station is determined as abnormal at least once, the master station notifies the administrator to that effect. In an example explained in this fourth embodiment, a degree of urgency for maintenance can be arbitrarily set for each slave station.

Figure 13:
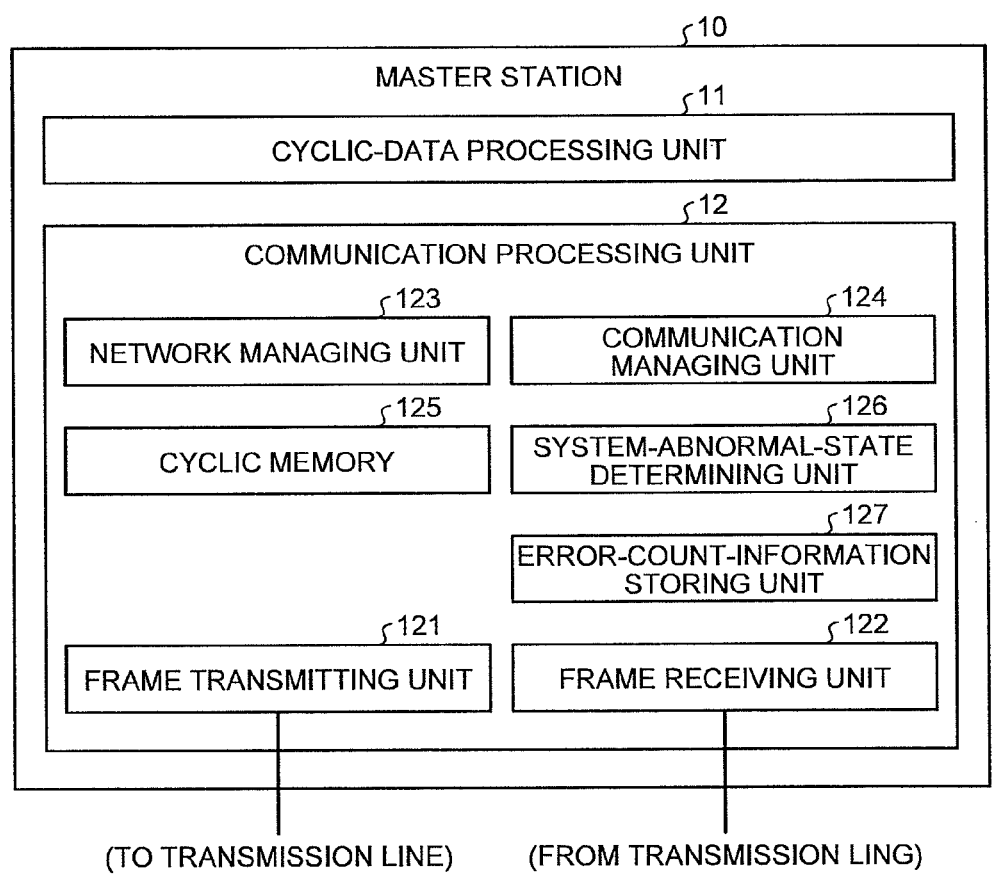
FIG. 13 is a schematic block diagram of a functional configuration of a master station according to a fourth embodiment.

FIG. 13 is a schematic block diagram of a functional configuration of a master station according to the fourth embodiment. The master station 10 further includes, in the configuration of the first embodiment, an error-count-information storing unit 127 that stores error count information including an error determination value for setting, for each slave station 30, how many times an error is counted to determine that the slave station 30 has a problem related to its own system (notify the administrator of the error) and a cumulative number of error counts for storing, for each slave station 30, how many times an error is continuously counted to the present. The system-abnormal-state determining unit 126 acquires, for each slave station 30, error count information from the error-count-information storing unit 127 and determines, based on the error determination value and the error count information, whether the slave station 30 is abnormal as a system. In other words, concerning a certain slave station 30, when the continuously-counted cumulative number of error counts is equal to the error determination value, the system-abnormal-state determining unit 126 determines that the slave station 30 is abnormal as a system. If an error is not counted at all, the cumulative number of error counts is reset to 0. Because the other configuration is the same as that in the first embodiment, explanation of the configuration is omitted.

Processing for determining whether the slave station 30 is normal as a system by the master station 10 is explained. FIG. 14 is a flowchart explaining an example of a procedure of determination processing for an abnormal state of the communication system by the master station. It is assumed that the master station 10 has received state notification frames transmitted from the slave stations 30 and has stored contents of the state notification frames in the memory.

First, the communication managing unit 124 of the master station 10 determines whether the master station 10 receives a token frame addressed to the own station (step S401). When the master station 10 does not receive a token frame addressed to the own station (No at step S401), the master station 10 is in a waiting state until the master station 10 receives a token frame addressed to the own station.

When the master station 10 receives a token frame addressed to the own station (Yes at step S401), the system-abnormal-state determining unit 126 selects a state notification frame of one slave station 30 out of the state notification frames stored in the memory (step S402). The system-abnormal-state determining unit 126 acquires a value of data expansion state information (Cyc_set) of the state notification frame of the slave station 30 and determines whether the value is "1" or "0" (step S403).

When the value of the data expansion state information Cyc_set of the state notification frame is "1", the slave station 30 has been able to normally receive data addressed to the own station and the application 34 of the slave station 30 has given data rewriting permission for the cyclic memory 33, the system-abnormal-state determining unit 126 determines that the slave station 30 is in a normal state as a system (step S404). The system-abnormal-state determining unit 126 resets a cumulative number of error counts (ERR_CNT) stored in the error-count-information storing unit 127 concerning the selected slave station 30 to "0" (step S407).

On the other hand, when the value of the state notification frame Cyc_set stored in the memory is "0", the slave station 30 has not been able to normally receive the data addressed to the own station or the application 34 of the slave station 30 has not given data rewriting permission. Therefore, the system-abnormal-state determining unit 126 further determines whether the slave station 30 was in a state in which the slave station 30 was able to receive cyclic data. In other words, the system-abnormal-state determining unit 126 determines whether a value of data processing state information (RX_status) in the state notification frame is "0" or "1" (step S405).

When the value of the data processing state information RX_status of the state notification frame is "0", the slave station 30 was in a state in which the slave station 30 was unable to receive cyclic data. In other words, the slave station 30 was in a state in which the slave station 30 was unable to expand cyclic data into the cyclic memory 33 and unable to receive cyclic data. Therefore, the system-abnormal-state determining unit 126 determines that the slave station 30 does not have a problem related to its own system and is in a normal state (step S406). Thereafter, the system-abnormal-state determining unit 126 resets a cumulative number of error counts (ERR_CNT) stored in the error-count-information storing unit 127 concerning the selected slave station 30 to "0" (step S407).

On the other hand, when the value of the data processing state information RX_status of the state notification frame is "1", the slave station 30 was in a state in which the slave station 30 was able to receive cyclic data. In other words, the slave station 30 was not able to receive cyclic data, although the slave station 30 was in a state in which the slave station 30 was able to receive the cyclic data. Therefore, although, in general, the slave station 30 is determined as being in a abnormal state as a system, the system-abnormal-state determining unit 126 determines that an error has occurred. The system-abnormal-state determining unit 126 adds 1 to the cumulative number of error counts (ERR_CNT) stored in the error-count-information storing unit 127 concerning the selected slave station 30 (step S408). The added-up cumulative number of error counts is stored in the error-count-information storing unit 127 in association with the selected slave station 30.

Thereafter, the system-abnormal-state determining unit 126 determines whether the added-up cumulative number of error counts (ERR_CNT) is equal an error determination value (NG_CNT) stored in the error-count-information storing unit 127 concerning the selected slave station 30 (step S409). When the cumulative number of error counts is equal to the error determination value (Yes at step S409), the system-abnormal-state determining unit 126 determines that a problem as a system has occurred (step S410). The system-abnormal-state determining unit 126 notifies the administrator that the slave station 30 is abnormal as a system.

After steps S407 and S410 or when the cumulative number of error counts is smaller than the error determination value at step S409, the system-abnormal-state determining unit 126 determines whether the processing has been performed for the state notification frames of all the slave stations 30 stored in the memory (step S411). When the processing has not been performed for the state notification frames of all the slave stations 30 (No at step S411), the processing returns to step S402. When the processing has been performed for the state notification frames of all the slave stations 30 (Yes at step S411), the processing ends.

The determination processing in the fourth embodiment can be performed for the state notification frames transmitted by the slave stations 30 in the first to third embodiments.

According to the fourth embodiment, when the slave station 30 is in a state in which the slave station 30 does not expand cyclic data into the cyclic memory 33 and can process the cyclic data at the time of receiving the cyclic data, this state is determined as an error. When this error is continuously detected the number of times of the error determination value set for each slave station 30, it is determined that the slave station 30 has a problem related to its own system. Consequently, it is possible to differentiate, according to the number of times of continuation, the slave station 30 that is important as a system component and the slave station 30 that is not important as a system component. As a result, there is an effect that it is possible to flexibly set a degree of influence of a frame loss on the system, leading to improvement of maintainability.

Industrial Applicability

As explained above, the communication system according to the present invention is useful for an FA network that performs transmission and reception of data at a predetermined period.

Reference Signs List

10 Master Station
11 Cyclic-Data Processing Unit
12 Communication Processing Unit
30, 30A, 30B Slave Stations
31 Frame Receiving Unit
32 Cyclic-Data-Reception Checking Unit
33, 125 Cyclic Memories
34 Application
35 Application-State Monitoring Unit
36 Cyclic-Memory Managing Unit
37 State-Notification-Frame Generating Unit
38 Frame Transmitting Unit
50 Cable
121 Frame Transmitting Unit
122 Frame Receiving Unit
123 Network Managing Unit
124 Communication Managing Unit
126 System-Abnormal-State Determining Unit
127 Error-Count-Information Storing Unit
311 Cyclic-Data-Reception Recognizing Function
312 Token-Frame-Reception Recognizing Function
313 Cyclic Data Temporary Buffer

The invention claimed is:

1. A communication system that circulates a token frame in order in a network in which one communication management apparatus and one or more communication apparatuses are connected via a transmission line and repeatedly performs transmission of a data frame at a predetermined period, wherein the communication apparatus includes:
- a memory that stores cyclic data addressed to the own apparatus received from the communication management apparatus;
- an arithmetic processing unit that performs a predetermined arithmetic operation using the cyclic data stored in the memory;
- a cyclic data temporary buffer that temporarily stores the cyclic data;
- a cyclic-data-reception checking unit that determines whether the cyclic data addressed to the own station is normally received in the cyclic data temporary buffer and outputs cyclic data reception state information, which is a result of the determination;
- a monitoring unit that outputs data rewriting permission information when the arithmetic processing unit instructs expansion into the memory of the cyclic data stored in the cyclic data temporary buffer;
- a cyclic-memory managing unit that determines, based on the cyclic data reception state information and the data rewriting permission information, whether the normally-received cyclic data is to be expanded into the memory, and generates data expansion state information indicating whether a data frame is expanded into the memory at a time of receiving the data frame from the communication management apparatus and data processing state information indicating whether the communication apparatus is in a state in which the communication apparatus can receive the data frame at the time of receiving the data frame;
- a state-notification-frame generating unit that generates, when the own apparatus has a transmission right, a state notification frame addressed to the communication management apparatus including the data expansion state information and the data processing state information; and
- a frame transmitting unit that transmits, when the own apparatus has the transmission right, a data frame generated by the arithmetic processing unit and the state notification frame, and the communication management apparatus includes:
- a cyclic-data processing unit that performs a predetermined arithmetic operation using a data frame received from the communication apparatus connected to the network and generates cyclic data for the communication apparatus;
- a frame transmitting unit that transmits the cyclic data to the communication apparatus when the own apparatus has the transmission right;
- a frame receiving unit that receives the data frame transmitted from the communication apparatus; and
- a system-abnormal-state determining unit that determines, when the token frame, the transmission right of which is given to the own apparatus, is received, an error state of the communication apparatus using the data expansion state information and the data processing state information of the state notification frame from the communication apparatus received from the frame receiving unit.

2. The communication system according to claim 1, wherein the system-abnormal-state determining unit of the communication management apparatus
- determines that the communication apparatus is normal when the data expansion state information indicates that the data frame is expanded into the memory or when the data expansion state information indicates that the frame data is not expanded into the memory and the data processing state information indicates that the data frame cannot be received and
- determines that the communication apparatus is in the error state when the data expansion state information indicates that the data frame is not expanded into the memory and the data processing state information indicates that the data frame can be received.

3. The communication system according to claim 1, wherein the cyclic data temporary buffer of the communication apparatus stores only the cyclic data addressed to the own apparatus.

4. The communication system according to claim 1, wherein
the cyclic-data-reception checking unit of the communication apparatus further outputs acquisition period information indicating whether the communication apparatus receives the cyclic data addressed to the own apparatus or receives another frame without receiving the cyclic data addressed to the own apparatus, and
the cyclic-memory managing unit
- generates, when the cyclic data addressed to the own apparatus indicated by the acquisition period information is received, a reception state of the communication apparatus at the time of receiving the cyclic data as the data processing state information and
- generates, when the acquisition period information indicates that another frame is received, a reception state of the communication apparatus at the time of receiving the other frame as the data processing state information.

5. The communication system according to claim 4, wherein the other frame is a token frame for giving the transmission right to the communication apparatus.

6. The communication system according to claim 4, wherein the other frame is a token frame issued by the communication management apparatus.

7. The communication system according to claim 4, wherein
the cyclic data temporary buffer of the communication apparatus stores all cyclic data transmitted from the communication management apparatus, and
the cyclic-memory managing unit of the communication apparatus expands, when it is determined based on the cyclic data reception state information and the data rewriting permission information that the cyclic data is expanded into the memory, only the cyclic data addressed to the own apparatus into the memory from the cyclic data stored in the cyclic data temporary buffer.

8. The communication system according to claim 7, wherein the other frame is cyclic data of another the communication apparatus that reaches later than the cyclic data addressed to the own apparatus.

9. The communication system according to claim 1, wherein the system-abnormal-state determining unit of the communication management apparatus compares, when it is determined that the communication apparatus is in the error state, a cumulative number of times of errors the communication apparatus is continuously determined as being in the error state and an error determination value set for the communication apparatus for determining that the communication apparatus has a significant problem related to its own system and determines whether the communication apparatus has a significant problem related to its own system.

10. The communication system according to claim 1, wherein the communication management apparatus further includes an output unit that outputs, when the system-abnormal-state determining unit determines that the communication apparatus is in the error state, an indication to that effect.

11. The communication system according to claim 9, wherein the communication management apparatus further includes an output unit that outputs, when the system-abnormal-state determining unit determines that the communication apparatus has a significant problem related to its own system, an indication to that effect.

12. A communication apparatus state determining method for determining, in a communication system that circulates a token frame in order in a network in which one communication management apparatus and one or more communication apparatuses are connected via a transmission line and repeatedly performs transmission of a data frame at a predetermined period, a state of the communication apparatus, the communication apparatus state determining method comprising:

a cyclic data transmitting step of the communication management apparatus transmitting cyclic data to all the communication apparatuses in the network;

a first token frame transmitting step of the communication management apparatus transmitting the token frame to the communication apparatus that acquires a transmission right next;

a cyclic data buffering step of the communication apparatus storing cyclic data addressed to the own apparatus in the cyclic data in a temporary buffer;

a cyclic data reception confirmation step of determining whether the cyclic data stored in the temporary buffer is normally received;

a cyclic data expansion processing step of the communication apparatus determining, based on presence or absence of an instruction for expansion into a memory of the cyclic data stored in the temporary buffer from an arithmetic processing unit of the communication apparatus and a determination result of the cyclic data reception confirmation step, presence or absence of expansion of the cyclic data from the temporary buffer into the memory;

a frame transmitting step of the communication apparatus transmitting, when receiving the token frame and recognizing that the own apparatus has the transmission right, a state notification frame including data expansion state information indicating whether the cyclic data is expanded into the memory when the cyclic data is received in the cyclic data buffering step and data processing state information indicating whether the communication apparatus is in a state in which the communication apparatus can receive the data frame, and the cyclic data frame including cyclic data generated by the arithmetic processing unit;

a second token frame transmitting step of the communication apparatus transmitting the token frame to the communication apparatus that acquires the transmission right next or the communication management apparatus; and a system abnormal state determining step of the communication management apparatus determining, when receiving a token frame and recognizing that the own apparatus has the transmission right, an error state of the communication apparatus using the data expansion state information and the data processing state information of the state notification frame transmitted from the communication apparatus.

13. The communication apparatus state determining method according to claim 12, wherein, in the step of system abnormal state determining step, the communication management apparatus determines that the communication apparatus is normal when the data expansion state information indicates that the data frame is expanded into the memory or when the data expansion state information indicates that the frame data is not expanded into the memory and the data processing state information indicates that the data frame cannot be received and determines that the communication apparatus is in the error state when the data expansion state information indicates that the data frame is not expanded into the memory and the data processing state information indicates that the data frame can be received.

14. The communication apparatus state determining method according to claim 12, wherein in the cyclic data reception confirmation step, the communication apparatus generates acquisition period information indicating whether the communication apparatus receives the cyclic data addressed to the own apparatus or receives another frame without receiving the cyclic data addressed to the own apparatus, and in the frame transmitting step, when the acquisition period information indicates that the cyclic data addressed to the own apparatus is received, the data processing state information indicates a state of the communication apparatus at the time of receiving the cyclic data and, when the acquisition period information indicates that another frame is received, the data processing state information indicates a reception state of the communication apparatus at the time of receiving the other frame.

15. The communication apparatus state determining method according to claim 14, wherein the other frame is a token frame for giving the transmission right to the communication apparatus.

16. The communication apparatus state determining method according to claim 14, wherein the other frame is a token frame issued by the communication management apparatus.

17. The communication apparatus state determining method according to claim 14, wherein in the cyclic data buffering step, the communication apparatus stores all cyclic data transmitted from the communication management apparatus in the temporary buffer, and in the cyclic data expansion processing step, the communication apparatus expands, when it is determined that the cyclic data is expanded into the memory, only the cyclic data addressed to the own apparatus into the memory from the cyclic data stored in the temporary buffer.

18. The communication apparatus state determining method according to claim 17, wherein the other frame is cyclic data of another the communication apparatus that reaches later than the cyclic data addressed to the own apparatus.

19. The communication apparatus state determining method according to claim 12, wherein, in the system abnormal state determining step, the communication management apparatus compares, when it is determined that the communication apparatus is in the error state, a cumulative number of error counts the communication apparatus is continuously determined as being in the error state and an error determination value set for the communication apparatus for determining that the communication apparatus has a significant problem related to its own system and determines whether the communication apparatus has a significant problem related to its own system.

* * * * *